United States Patent
Cho et al.

(10) Patent No.: US 10,053,217 B2
(45) Date of Patent: Aug. 21, 2018

(54) UNMANNED AERIAL VEHICLE AND METHOD OF CONTROLLING THE SAME

(71) Applicant: LG ELECTRONICS INC., Seoul (KR)

(72) Inventors: Taehoon Cho, Seoul (KR); Choonghwan Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 69 days.

(21) Appl. No.: 14/845,988

(22) Filed: Sep. 4, 2015

(65) Prior Publication Data

US 2016/0272317 A1 Sep. 22, 2016

(30) Foreign Application Priority Data

Mar. 18, 2015 (KR) .................. 10-2015-0037581

(51) Int. Cl.
*B64C 39/02* (2006.01)
*B60P 3/11* (2006.01)
(Continued)

(52) U.S. Cl.
CPC .......... *B64C 39/024* (2013.01); *A62C 3/0242* (2013.01); *B60P 3/11* (2013.01);
(Continued)

(58) Field of Classification Search
CPC ............ B64C 39/024; B64C 2201/126; B64C 2201/141; B64C 2201/027;
(Continued)

(56) References Cited

U.S. PATENT DOCUMENTS 8,439,301 B1* 5/2013 Lussier ............... B64F 1/02
244/63
2004/0000992 A1* 1/2004 Cuddihy ............ G08B 25/016
340/436
(Continued)

FOREIGN PATENT DOCUMENTS

FR 2986647 8/2013
WO 2008/147681 4/2008
(Continued)

OTHER PUBLICATIONS

Wikipedia article, Aerial Advertising, printed Dec. 21, 2016.*
(Continued)

*Primary Examiner* — Alan D Hutchinson
(74) *Attorney, Agent, or Firm* — Lee, Hong, Degerman, Kang & Waimey

(57) ABSTRACT

An unmanned aerial vehicle according to the present invention includes a housing mounted on a vehicle and having an inner space, the housing provided with a launching unit, an unmanned aerial vehicle accommodated in the housing and configured to be launched from the housing when a driving state of the vehicle meets a preset condition, wing units mounted to the unmanned aerial vehicle and configured to allow the flight of the unmanned aerial vehicle in response to the launch from the housing, an output unit disposed on the unmanned aerial vehicle, and a controller configured to control the wing units to move the unmanned aerial vehicle to a position set based on information related to the driving state when the unmanned aerial vehicle is launched, and control the output unit to output warning information related to the driving state.

23 Claims, 39 Drawing Sheets

(51) Int. Cl.
*B64F 1/22* (2006.01)
*A62C 3/02* (2006.01)
*G05D 1/00* (2006.01)
*G05D 1/10* (2006.01)
*G08G 1/09* (2006.01)
*G08G 1/16* (2006.01)
*B60Q 1/52* (2006.01)
*G08G 1/04* (2006.01)
*G08G 1/0955* (2006.01)
*G08G 1/00* (2006.01)

(52) U.S. Cl.
CPC .............. *B60Q 1/525* (2013.01); *B64F 1/222* (2013.01); *G05D 1/0088* (2013.01); *G05D 1/101* (2013.01); *G08G 1/04* (2013.01); *G08G 1/09* (2013.01); *G08G 1/0955* (2013.01); *G08G 1/16* (2013.01); *G08G 1/162* (2013.01); *G08G 1/205* (2013.01); *B64C 2201/027* (2013.01); *B64C 2201/08* (2013.01); *B64C 2201/108* (2013.01); *B64C 2201/126* (2013.01); *B64C 2201/141* (2013.01); *B64C 2201/208* (2013.01)

(58) Field of Classification Search
CPC ........ B64C 2201/108; B64C 2201/208; B64C 2201/08; G05D 1/0088; G05D 1/101; G08G 1/16; G08G 1/09; A62C 3/0242; B64F 1/222; B60P 3/11
See application file for complete search history.

(56) References Cited

U.S. PATENT DOCUMENTS

| | | | |
|---|---|---|---|
| 2009/0314883 A1* | 12/2009 | Arlton | B64C 39/024 244/63 |
| 2010/0104139 A1* | 4/2010 | Kuehnle | G06K 9/00798 382/106 |
| 2010/0131121 A1 | 5/2010 | Gerlock | |
| 2011/0168838 A1 | 7/2011 | Hornback et al. | |
| 2011/0266394 A1 | 11/2011 | Erben et al. | |
| 2013/0057397 A1* | 3/2013 | Cutler | B62D 15/0255 340/435 |
| 2013/0134254 A1* | 5/2013 | Moore | B64D 1/16 244/17.11 |
| 2013/0233964 A1 | 9/2013 | Woodworth et al. | |
| 2014/0263852 A1 | 9/2014 | Walker et al. | |
| 2015/0008280 A1 | 1/2015 | Smoker | |
| 2015/0102154 A1* | 4/2015 | Duncan | B64C 39/022 244/2 |
| 2015/0267996 A1* | 9/2015 | Su | B64C 39/024 89/1.816 |
| 2015/0274294 A1* | 10/2015 | Dahlstrom | B64D 1/18 239/722 |
| 2015/0321758 A1* | 11/2015 | Sarna, II | B64C 39/024 244/63 |

FOREIGN PATENT DOCUMENTS

| | | | |
|---|---|---|---|
| WO | 2014/035518 | | 3/2014 |
| WO | WO 2014080388 | † | 3/2014 |
| WO | 2014/080387 | | 5/2014 |
| WO | 2015/057832 | | 4/2015 |

OTHER PUBLICATIONS

European Patent Office Application Serial No. 15003180.5 Search Report dated Jul. 25, 2016, 8 pages.
PCT International Application No. PCT/KR2015/011438, Written Opinion of the International Searching Authority dated Feb. 18, 2016, 15 pages.

* cited by examiner
† cited by third party

UNMANNED AERIAL VEHICLE AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0037581, filed on Mar. 18, 2015, the contents of which is incorporated by reference herein in its entirety.

FIELD OF THE INVENTION

This specification relates to an unmanned aerial vehicle flying in the air.

DESCRIPTION OF THE RELATED ART

Unmanned aerial vehicles as aircrafts without using a runaway are aerial vehicles, which can be provided with various functions, such as transporting goods, capturing images, low attitude reconnaissance and the like, in a relatively light compact main body. Such unmanned aerial vehicles are currently applied to various fields. The unmanned aerial vehicle is remotely controllable and may be controlled to perform a function in a desired area.

In recent time, studies on a vehicle field including an unmanned aerial vehicle, which flies above a specific position according to a user's control command, are undergoing. As an example, an unmanned aerial vehicle, which performs a function of collecting information during flight and providing the collected information to a driver of another vehicle, are under development.

However, the driver of the other vehicle should perform not only the control for the flight of the unmanned aerial vehicle but also the control for an additional function while driving the other vehicle. Specifically, when the unmanned aerial vehicle is mounted in the vehicle, the driver's control is required to be performed, starting from a stage of separating the unmanned aerial vehicle from the other vehicle for use. Accordingly, when the user is unable to input a control command to the unmanned aerial vehicle, especially, when an accident happens or the driver is injured, the unmanned aerial vehicle is disadvantageously unable to be used.

SUMMARY OF THE INVENTION

An aspect of the present invention is to provide an unmanned aerial vehicle, capable of outputting information related to a driving state of another vehicle at a specific position by being launched from the vehicle on the basis of the driving state of the other vehicle.

To achieve these and other advantages and in accordance with the purpose of the present invention, as embodied and broadly described herein, there is provided an unmanned aerial vehicle including a housing mounted on another vehicle and having an inner space, the housing provided with a launching unit, an unmanned aerial vehicle accommodated in the housing and configured to be launched from the housing when a driving state of the vehicle meets a preset condition, wing units mounted to the unmanned aerial vehicle and configured to allow the flight of the unmanned aerial vehicle in response to the launch from the housing, an output unit disposed on the unmanned aerial vehicle, and a controller configured to control the wing units to move the unmanned aerial vehicle to a position set on the basis of information related to the driving state when the unmanned aerial vehicle is launched, and control the output unit to output warning information related to the driving state. According to the present invention, the unmanned aerial vehicle can be launched according to the driving state of the vehicle without a user's control command.

In accordance with one embodiment of the present invention, the controller may determine a possible collision against an object, located outside the vehicle, on the basis of an image of the outside of the vehicle and the driving state, and control the housing to launch the unmanned aerial vehicle when the possible collision against the object is detected. This may result in prevention of an accident.

In accordance with one embodiment of the present invention, the preset condition may correspond to a generation of an impact on the vehicle. Also, the unmanned aerial vehicle may be launched without a user's control command when an accident of the vehicle happens, and thus perform a specific function. This may facilitate handling of the accident and rescue of the driver.

In accordance with one embodiment of the present invention, the controller may control the housing to launch the unmanned aerial vehicle on the basis of an additional control command received, under the state that a degree of the impact is smaller than a preset reference degree. Therefore, the launch of the unmanned aerial vehicle can be restricted when it is not necessary, thereby preventing a loss of power.

In accordance with one embodiment of the present invention, the set position and the vehicle may be spaced apart from each other by a distance decided based on the driving state, and the unmanned aerial vehicle may fly (move) opposite to the moving (or driving) direction of the vehicle based on the driving state. This may allow the possible collision against the vehicle to be notified to another vehicle which is likely to collide with the vehicle.

An unmanned aerial vehicle according to the present invention may be launched from another vehicle without a separate control command when the vehicle meets a preset condition, such as an impact thereon, and output warning information related to a driving state of the vehicle. When an accident of the vehicle happens, the unmanned aerial vehicle may provide warning information to a rear vehicle following behind the vehicle, thereby preventing a secondary accident.

A position of the unmanned aerial vehicle which outputs the warning information and an output state of the warning information may be decided based on the driving state of the vehicle and external environments captured through cameras. Therefore, appropriate warning information can be provided according to the driving state of the vehicle.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, the present invention will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Figure 1A:
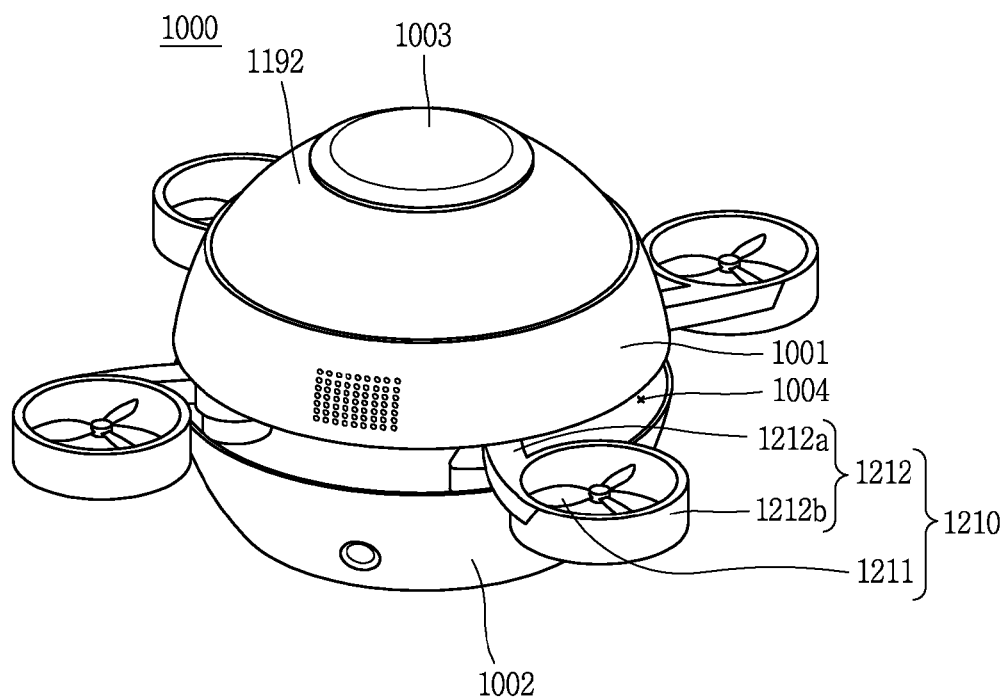
FIG. 1A is a view of an unmanned aerial vehicle in an accommodation mode in accordance with one exemplary embodiment of the present invention, viewed from one direction.
Figure 1B:
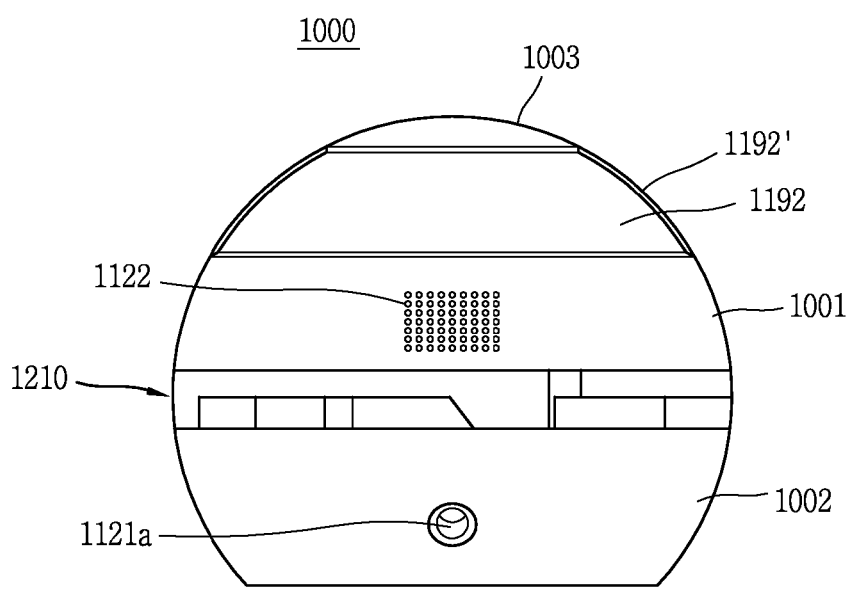
FIG. 1B is a view of the unmanned aerial vehicle in a flight mode in accordance with the one exemplary embodiment of the present invention viewed from one direction.
Figure 1C:
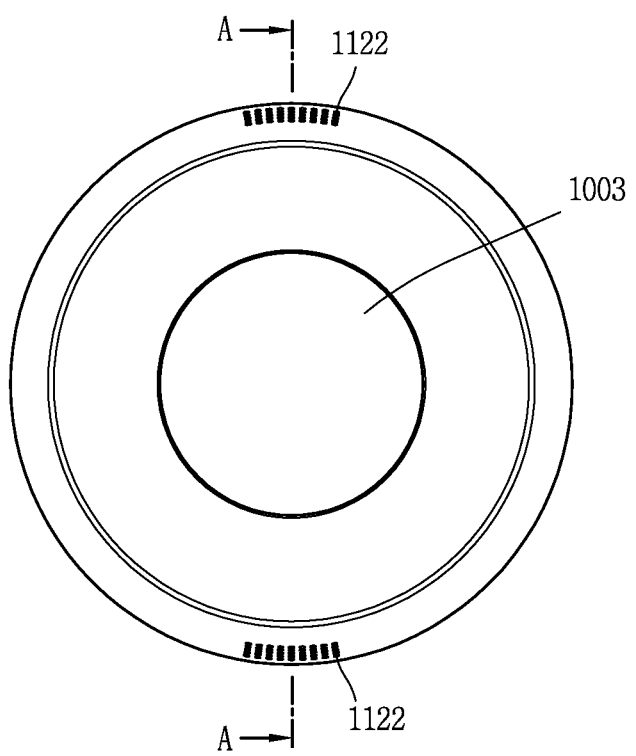
FIG. 1C is a view of the unmanned aerial vehicle of 1A, viewed from another direction.
Figure 2:
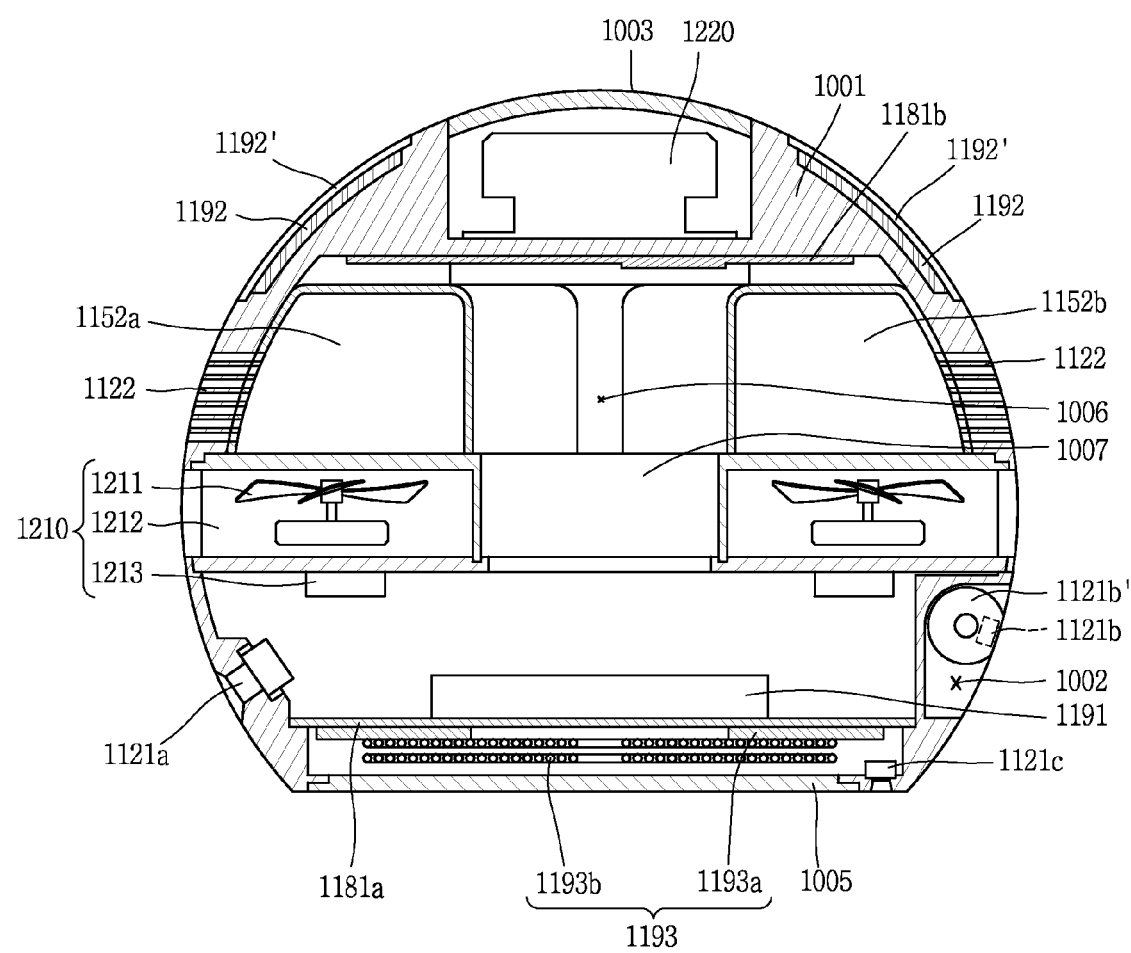
FIG. 2 is a sectional view taken along the line A-A of FIG. 1C.

FIG. 1A is a view of an unmanned aerial vehicle in an accommodation mode in accordance with one exemplary embodiment disclosed herein, viewed from one direction, FIG. 1B is a view of the unmanned aerial vehicle in a flight mode in accordance with the one exemplary embodiment disclosed herein, viewed from one direction, FIG. 1C is a view of the unmanned aerial vehicle of 1A, viewed from another direction, and FIG. 2 is a sectional view taken along the line A-A of FIG. 1C.

An unmanned aerial vehicle 1000 according to the present invention is configured to fly in the air. A housing 2000 (see FIG. 4), a wireless communication unit, and a controller to control the unmanned aerial vehicle are provided.

The unmanned aerial vehicle 1000 disclosed herein may substantially be configured into a spherical shape in an accommodation mode. The unmanned aerial vehicle 1000 includes an upper case 1001, a lower case 1002, an upper cover 1003, an accommodating unit 1004, and a lower cover 1005 (see FIG. 2), all of which define appearance of the unmanned aerial vehicle 1000 and form an internal space. Between the upper case 1001 and the upper cover 1003 is interposed a solar heat charging unit 1192.

Outer surfaces of the upper case 1001, the lower case 1002, the upper cover 1003 and the solar heat charging unit 1192 may be formed in a curved shape, and one region of the unmanned aerial vehicle 1000 may be formed in a spherical shape. As illustrated in FIG. 1C, a shape of the unmanned aerial vehicle 1000, viewed from the top, has a circular shape. Meanwhile, the lower cover 1005 may be formed flat. The flat lower cover 1005 may allow the unmanned aerial vehicle 1000 to be stably landed (settled) on the ground.

A body part of the unmanned aerial vehicle 1000 may be stably kept (accommodated, received, stored, etc.) in the housing 2000 (see FIG. 4) by virtue of the lower cover 1005. Also, another region of the unmanned aerial vehicle 1000 may be formed in a spherical shape, which is advantageous in flight in the air.

Also, the upper case 1001 and the upper cover 1003 are configured to form a continuous curved surface. An externally-exposed surface of a wing unit 1210 may be formed to define a continuous curved surface with the upper case 1001 and the lower case 1002 while the wing unit 1210 is accommodated in the accommodating unit 1004.

The accommodating unit 1004 is located between the upper case 1001 and the lower case 1002. The wing unit 1210 is accommodated in the accommodating unit 1004. The wing unit 1210 may be provided in plurality. In the drawings, four wing units 1210 are illustrated, but the number of wing units may not be limited to this.

The wing unit 1210 includes a propeller 1211, a main body 1212 provided with a fixing portion 1212b to fix the propeller 1211, and a connection portion 1212a connected to the body part of the unmanned aerial vehicle 1000, and a driving shaft 1213 to rotatably connect the connection portion 1212a to the body part of the unmanned aerial vehicle 1000. One portion of the main body 1212 may have a curved surface to be flush with the curved outer surfaces of the upper and lower cases 1001 and 1002 in the accommodation mode. The driving shaft 1213 may rotate the connection portion 1212a such that the wing unit 1210 is projected out of the body part and thus the fixing portion 1212b is exposed to the outside of the body part when the accommodation mode is switched into the flight mode. When the propeller 1211 rotates in the flight mode, the body part flies.

The unmanned aerial vehicle 1000 according to one embodiment disclosed herein includes a first camera 1121a, a second camera 1121b, a third camera 1121c, a parachute unit 1220, first and second audio output modules 1152a and 1152b, audio output holes 1122, first and second printed circuit boards 1181a and 1181b, a power supply unit 1191, a solar heat charging unit 1192, and a first wireless charging unit 1193.

The unmanned aerial vehicle 1000 includes an inner frame 1007 to support those electronic components. The inner frame 1007 includes a cable accommodating portion 1006 through which a cable for electrically connecting upper and lower portions of the body part is inserted.

The first printed circuit board 1181a is located in a lower portion of the body part, and the second printed circuit board 1181b is located in an upper portion of the body part. The cable may allow the first and second printed circuit boards 1181a and 1181b to be electrically connected to each other. Besides the first and second printed circuit boards 1181a and 1181b, a plurality of flexible printed circuit boards for electrically connecting the electronic components may also be provided within the body part.

The first and second cameras 1121a and 1121b are electrically connected to the first printed circuit board 1181a. The first and second cameras 1121a and 1121b are spaced apart from each other within an inner space of the body part. The first camera 1121a captures images of the ground during the flight of the unmanned aerial vehicle 1000. The first camera 1121a is fixed to the lower case 1002 to capture an external environment at a predetermined angle. On the other hand, the second camera 1121b is rotatably fixed to the lower case 1002 such that its capturing angle can be changed. Detailed structures of the first and second cameras 1121a and 1121b will be explained later with reference to FIGS. 7A and 7B.

The third camera 1121c which captures an area below the body part is mounted to a portion adjacent to the lower cover 1005. The lower cover 1005 may include an opening through which at least one portion of the third camera 1121c is exposed. The third camera 1121c is electrically connected to the first printed circuit board 1181a.

While the unmanned aerial vehicle 1000 flies in the air, the third camera 1121c may capture the ground above which the unmanned aerial vehicle 1000 flies. Altitude (height) and inclination of the flight of the unmanned aerial vehicle 1000 may be sensed on the basis of the image of the external environment captured by the third camera 1121c. The controller of the unmanned aerial vehicle 1000 may control the wing unit 1210 to adjust the height of or balance the unmanned aerial vehicle 1000.

The first and second audio output modules 1152a and 1152b are spaced apart from each other in the body part. The first and second audio output modules 1152a and 1152b are electrically connected to the second printed circuit board 1181b, and may be controlled in an individual manner.

For example, the first and second audio output modules 1152a and 1152b may be controlled to output different sounds. Although not illustrated in detail, the unmanned aerial vehicle 1000 may further include an amplifier to amplify the sounds output from the first and second audio output modules 1152a and 1152b.

To emit the sounds output from the first and second audio output modules 1152a and 1152b, the audio output holes 1122 may be formed through one portion of the upper case 1001.

The cable accommodating portion 1006 which accommodates therein the cable for the electrical connection between the first and second printed circuit boards 1181a and 1181b is preferably disposed between the first and second audio output modules 1152a and 1152b.

The parachute unit 1220 is disposed on the second printed circuit board 1181b, which is located on the inner frame 1007 on the first and second audio output modules 1152a and 1152b. The inner frame 1007 may include an accommodation space for accommodating the parachute unit 1220 therein, and the accommodation space may be covered with the upper cover 1003. The parachute unit 1220 may be unfolded (or open) in response to a specific control command. When the parachute unit 1220 is unfolded, the upper cover 1003 may be detached from the unmanned aerial vehicle 1000.

The power supply unit 1191 for supplying power to the unmanned aerial vehicle 1000 is disposed on the first printed circuit board 1181a. The power supply unit 1191 may be charged by the solar heat charging unit 1192 and the first wireless charging unit 1193.

The body part of the unmanned aerial vehicle 1000 may further include a light-transmittable cover 1192' which is located on the solar heat charging unit 1192 to define the appearance of the body part. In detail, the body part may include a recess portion which is recessed to accommodate the solar heat charging unit 1192 therein. The solar heat charging unit 1192 and the light-transmittable cover 1192' may be disposed in the recess portion.

The unmanned aerial vehicle 1000 may be charged with electricity (power) by the solar heat charging unit 1192 during the flight. The charged power may extend a flight time of the unmanned aerial vehicle 1000. The solar heat charging unit 1192 converts energy of light introduced externally into electric energy during the flight of the unmanned aerial vehicle 1000.

The wireless charging unit 1193 which supplies power to the power supply unit 1191 is disposed in the lower portion of the body part. The first wireless charging unit 1193 may be disposed adjacent to the first printed circuit board 1181a. The power supply unit 1191 and the first wireless charging unit 1193 may be disposed in an overlapping manner.

The first wireless charging unit 1193 includes a first magnet portion 1193a and a first coil portion 1193b. When the body part is located within the housing 2000 (see FIG. 4), the first wireless charging unit 1193 may generate electric power by a second coil portion 2231 (see FIG. 5) accommodated in the housing 2000. The characteristic that the power supply unit 1191 is charged by the first wireless charging unit 1193 will be described in detail later with reference to FIG. 5.

The unmanned aerial vehicle 1000 may be mounted in another vehicle or the like, and be detached from the vehicle in response to a specific control command for flight. The unmanned aerial vehicle 1000 may be supplied with power while it is mounted in the vehicle, and charged with solar rays during the flight. Hereinafter, a structure which allows the unmanned aerial vehicle 100 to be mountable in the vehicle will be described.

Figure 3A:
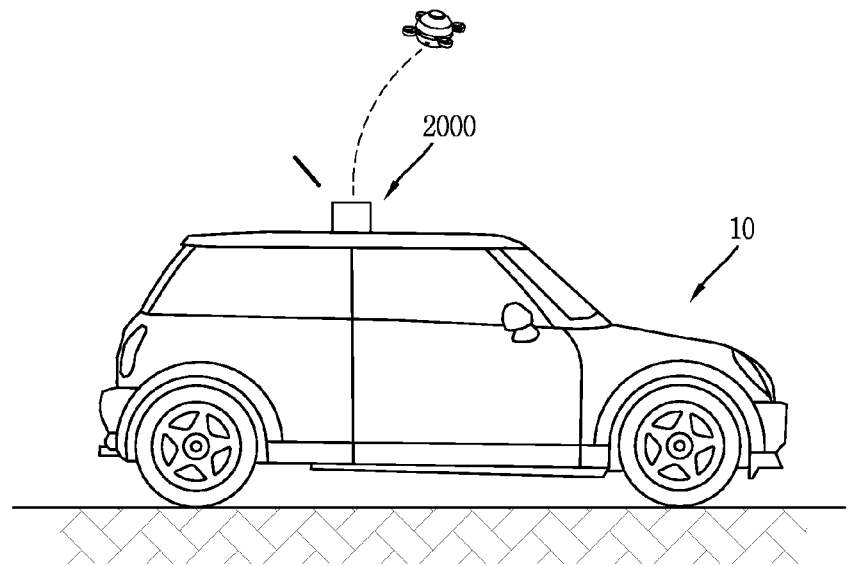
FIGS. 3A and 3B are conceptual views illustrating a state where the unmanned aerial vehicle is mounted to another vehicle.
Figure 3B:
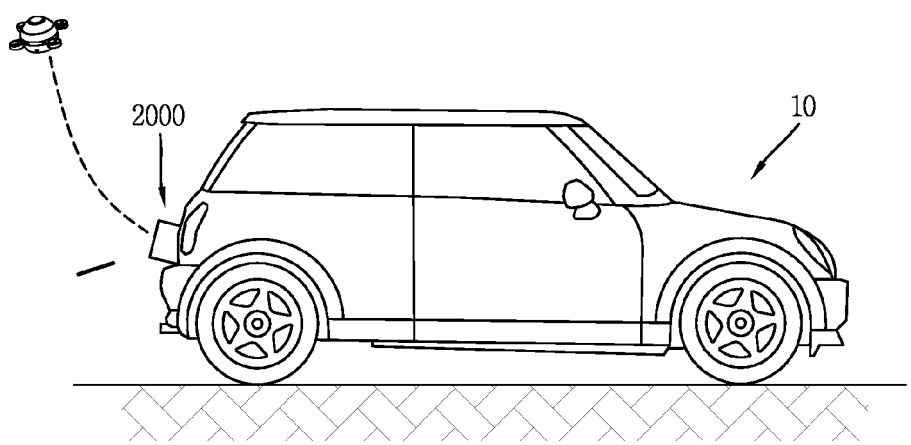
Figure 4:
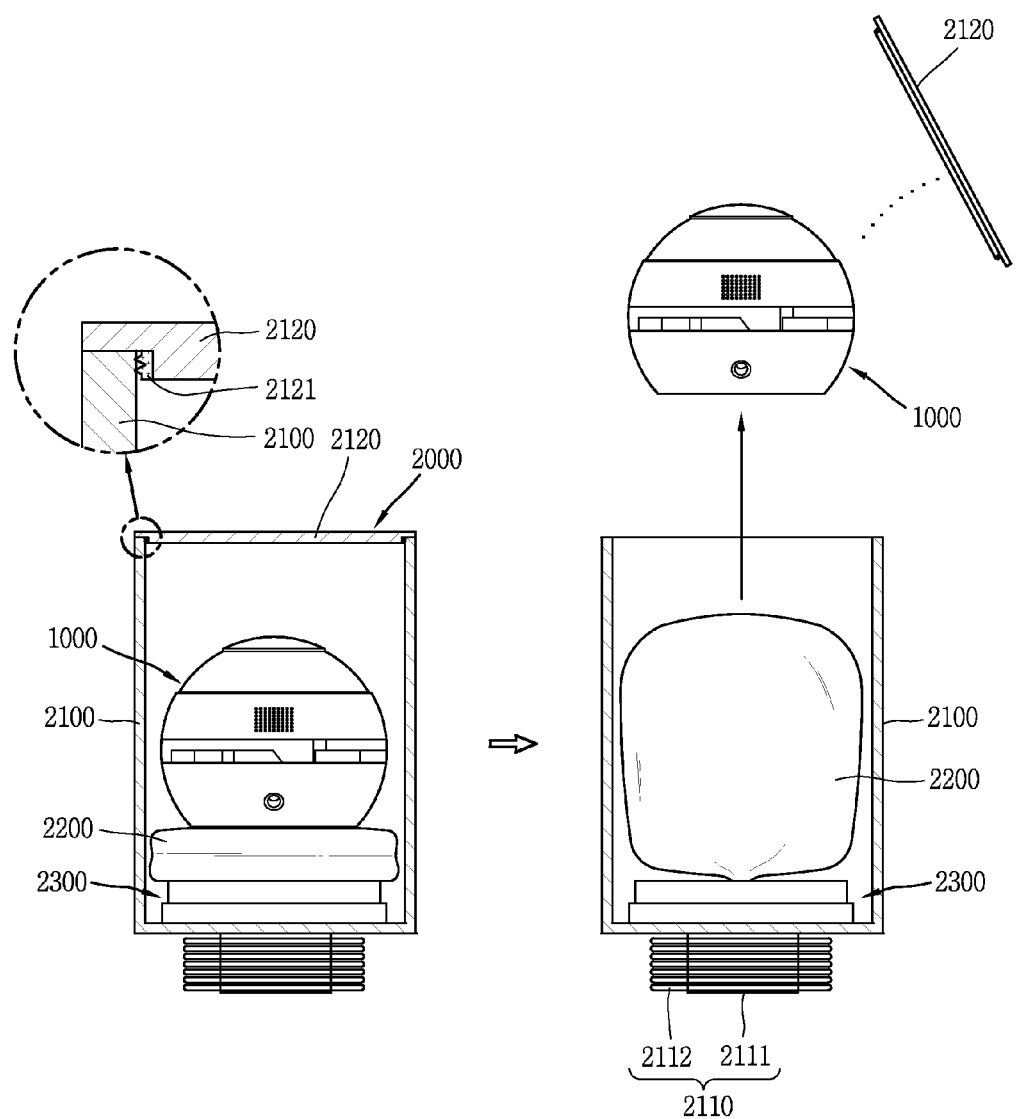
FIG. 4 is a conceptual view illustrating the unmanned aerial vehicle accommodated in a housing.

FIGS. 3A and 3B are conceptual views illustrating a state where an unmanned aerial vehicle is mounted in another vehicle 10, and FIG. 4 is a conceptual view illustrating the unmanned aerial vehicle accommodated in the housing 2000.

The unmanned aerial vehicle 1000 is mounted to one region of the vehicle 10 in an accommodated state in the housing 2000. The unmanned aerial vehicle 1000 which has been accommodated in the housing 2000 is launched from the housing 2000 in response to a specific control command.

As illustrated in FIG. 3A, the unmanned aerial vehicle 1000 may be mounted on a top of the vehicle 10. That is, the housing 2000 which accommodates the unmanned aerial vehicle 1000 therein is mounted on the top of the vehicle 10. The housing 2000 may protrude from an outer surface of the vehicle 10. However, the present invention may not be limited to this. A mounting structure which is recessed into the vehicle 10 may also be employed to accommodate the housing 2000 therein.

When the unmanned aerial vehicle 1000 is mounted on the top of the vehicle 10, the unmanned aerial vehicle 1000 may be launched upward from the vehicle 10 in response to the specific control command.

As illustrated in FIG. 3B, the unmanned aerial vehicle 1000 may be mounted to the rear of the vehicle 10 in the accommodated state in the housing 2000. One region of the housing 2000 may be disposed in an accommodation space corresponding to a trunk of the vehicle 10. The unmanned aerial vehicle 1000 according to this embodiment may be launched rearward from the vehicle 10 and then controlled to keep flying up into the air.

The unmanned aerial vehicle includes the housing 2000 fixed to one region of the vehicle 10 and accommodating the body part of the unmanned aerial vehicle 1000 therein. The housing 2000 is configured to launch the unmanned aerial vehicle 1000. Hereinafter, a detailed structure of the housing 2000 in which the unmanned aerial vehicle 1000 is accommodated will be described.

FIG. 4 is a conceptual view illustrating the housing for launching the unmanned aerial vehicle. The housing 2000 is formed in a cylindrical shape with an inner space. The housing 2000 includes a frame 2100 defining an appearance thereof, a fixing unit 2110 to fix the vehicle and the frame 2100 to each other, an airbag unit 2200, a control unit 2300, and a cover unit 2120 covering the inner space.

The housing 2000 may be formed in a cylindrical shape of which inner circumferential surface is curved to accommodate therein the unmanned aerial vehicle 1000 formed in the curved shape. The housing 2000 is fixed to the vehicle 10 (see FIG. 3A) by the fixing unit 2110. The fixing unit 2110 includes a fixing pin 2111 and an elastic supporter 2112. The elastic supporter 2112 may be configured as a spring surrounding an outer circumference of the fixing pin 2111. The elastic supporter 2112 prevents the housing 2000 from being damaged due to a weak impact, which is generated while the vehicle moves. The fixing unit 2110 for fixing the housing 2000 may be provided in plurality. The fixing unit may be provided on a lower portion of the housing 2000, but may not be limited to this. The fixing unit may also be mounted to one region of the frame 2100 of the housing 2000.

Strength of the fixing pin 2111 for fixing the housing 2000 is preferably weaker than that of the frame 2100. Accordingly, when an impact is applied to the vehicle 10, the fixing pin 2111 may be destroyed earlier than the frame 2100. This may minimize the damage of the unmanned aerial vehicle 1000 and also allow the unmanned aerial vehicle 1000 to be launched even if the frame 2100 is separated from the vehicle 10.

The control unit 2300 is mounted in the housing 2000 and the airbag unit 2200 is located on the control unit 2300. The unmanned aerial vehicle 1000 is laid on the airbag unit 2200 which is in a non-inflated state. When the unmanned aerial vehicle 1000 is laid on the airbag unit 2200 which has not been inflated, an empty space is formed in the inner space.

An upper portion of the frame 2100 may be formed open, and the cover unit 2120 is coupled to the top of the frame 2100. For example, a stepped portion may be formed at an edge portion of the cover unit 2120, so as to be coupled to the frame 2100.

The cover unit 2120 may further include a waterproof member 2121 disposed on one portion thereof coupled to the frame 2100. The waterproof member 2121 blocks fluid and contaminants introduced from the outside of the housing 2000, so as to prevent contamination of the unmanned aerial vehicle 1000. Accordingly, the housing 2000 may be mounted to the vehicle 10 (see FIG. 3A) to be exposed to the outside of the vehicle 10.

When the airbag unit 2200 is inflated in response to a specific control command, the unmanned aerial vehicle 1000 is moved to the upper portion of the housing 2000. The unmanned aerial vehicle 1000 is then launched outward with pushing the cover unit 2120, in response to the inflating force of the airbag unit 2200. The cover unit 2120 is detached from the frame 2100 by the inflating force.

In response to the airbag unit 2200 being inflated, the unmanned aerial vehicle 1000 may be launched outward and fly into the air.

Hereinafter, the internal structure of the housing 2000 for launching the unmanned aerial vehicle 1000 will be described in detail.

Figure 5:
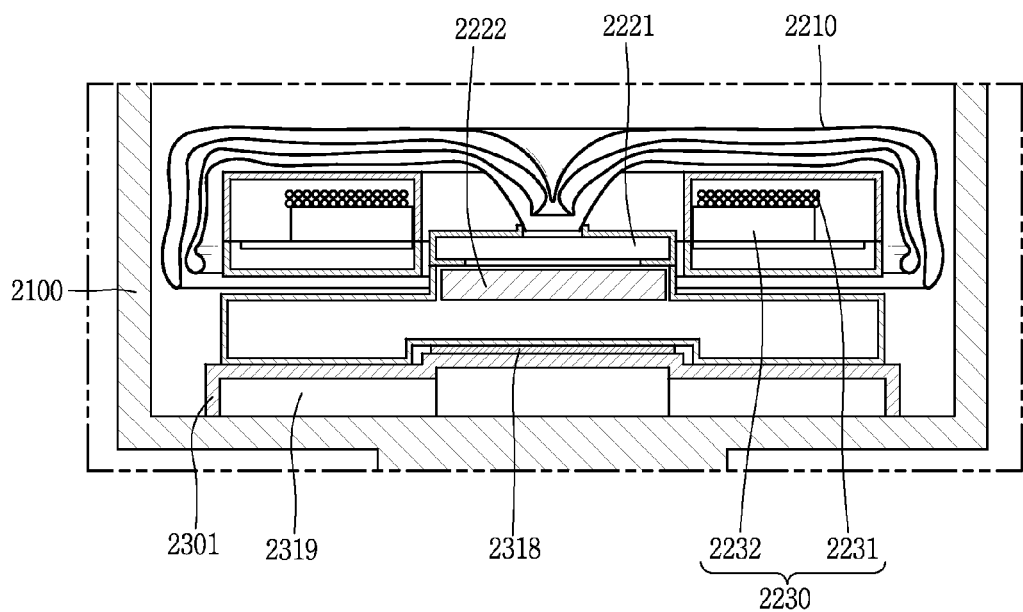
FIG. 5 is a conceptual view illustrating an internal structure of the housing in FIG. 4.

FIG. 5 is a conceptual view illustrating an internal structure of the housing.

As illustrated in FIGS. 4 and 5, the control unit 2300 disposed at the lower portion of the inner space of the housing 2000 includes an auxiliary power supply portion 2319, a third printed circuit board 2318, and a supporting frame 2301. The airbag unit 2200 located on the control unit 2300 includes a second wireless charging unit 2230, an airbag 2210, an ignition material 2221 and an ignition portion 2222.

The auxiliary power supply unit 2319 is located in a lower portion of the housing 2000. The supporting frame 2301 surrounds the auxiliary power supply unit 2319 and supports the other structure. The supporting frame 2301 may prevent the auxiliary power supply unit 2319 from being damaged due to the inflating force of the airbag unit 2200. The auxiliary power supply unit 2319 may receive power by being electrically connected to the vehicle 10. When power from the power supply unit 1191 (see FIG. 2) of the unmanned aerial vehicle 1000 is disabled, the auxiliary power supply unit 2319 may supply power to the unmanned aerial vehicle 1000.

The third printed circuit board 2318 is located on the supporting frame 2301. The third printed circuit board 2318 may be electrically connected to electronic components of the vehicle 10. The third printed circuit board 2318 may control the operation of the airbag unit 2200 in response to an external control command.

Further referring to FIG. 5, the second wireless charging unit 2230 for charging the power supply unit 1191 is disposed in the airbag 2210 of the airbag unit 2200. The second wireless charging unit 2230 may include a second coil portion 2231 and a second magnet portion 2232. The unmanned aerial vehicle 1000 may be fixed such that the first and second coil portions 1193b and 2231 are disposed adjacent to each other by the first and second magnet portions 1193b and 2232. The power supply unit 1191 may be charged with a magnetic flux, which is generated by the first and second coil portions 1193b and 2232 in response to a current supplied to the first and second coil portions 1193b and 2231. That is, the power supply unit 1191 of the unmanned aerial vehicle 1000 may be charged while being accommodated in the housing 2000.

An accommodation region of the ignition material 2221 and the airbag 2210 are connected to each other.

The ignition portion 2222 may further contain an igniter which is ignited in response to a specific control command. For example, the ignition portion 2222 may ignite the igniter in response to a control command, which is individually applied by a user, or ignite the igniter by use of a spark, which is generated when a safety pin (not illustrated) is removed by the vehicle 10 (see FIG. 3A).

The ignition material 2221 is a material which is required for instantaneously inflating the airbag 2210, and may be made of sodium azide ($NaN_3$) or nitro guanidine ($NH=C(NH_2)_2$). Such material is burnt and discomposed within about 0.03 seconds by the igniter, thereby generating nitrogen ($N_2$). The material is burnt by the spark transferred by the ignition portion 2222, and thereby the airbag 2210 is inflated.

Accordingly, the unmanned aerial vehicle 1000 may obtain a propulsive force via the airbag unit 2200, which has been inflated due to an occurrence of an accident or a user's control command, and thus be launched out of the housing 2000.

Figure 6:
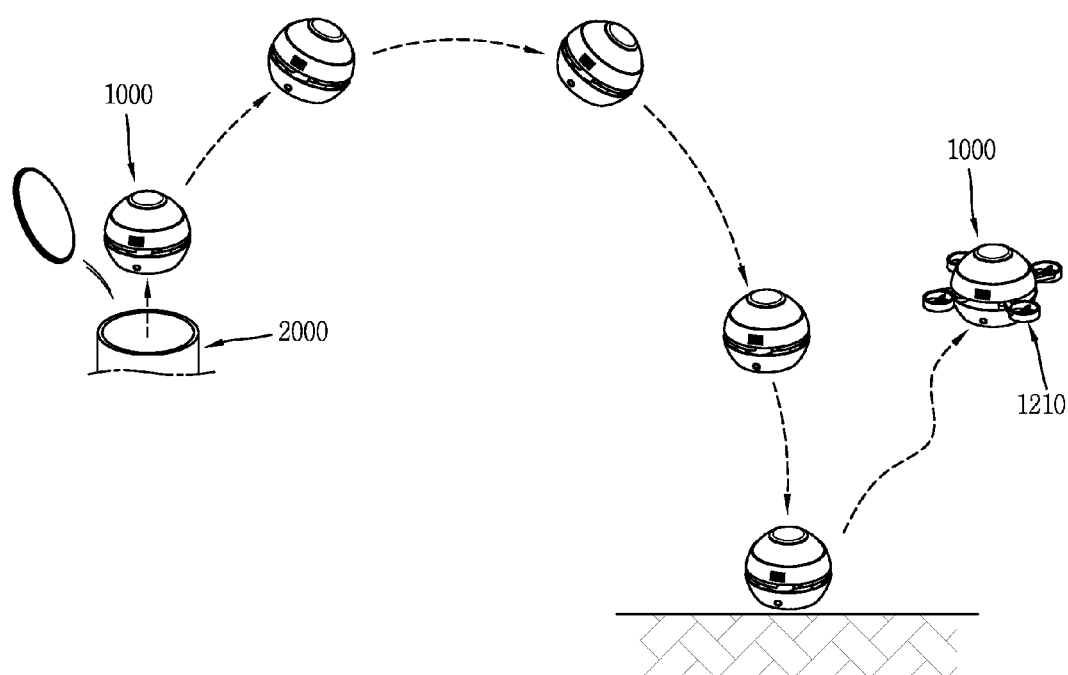
FIG. 6 is a conceptual view illustrating launch and flight of the unmanned aerial vehicle.

FIG. 6 is a conceptual view illustrating launch and flight of the unmanned aerial vehicle.

As illustrated in FIGS. 4 and 6, the unmanned aerial vehicle 1000 accommodated in the housing 2000 is launched outward by the airbag unit 2200, which has been inflated in response to the specific control command. After being launched from the housing 2000, the unmanned aerial vehicle 1000 is landed on the ground. The controller of the unmanned aerial vehicle 1000 does not activate the wing unit 1210 until after the unmanned aerial vehicle 1000 is landed on the ground.

Further referring to FIG. 2, the center of gravity of the unmanned aerial vehicle 1000 may be formed at the lower cover 1005. Accordingly, even though the unmanned aerial vehicle 1000 is launched from the housing 2000 in any direction, the lower cover 1005 can be landed on the ground.

When the bottom of the unmanned aerial vehicle 1000 is landed on the ground, the controller controls the wing unit 1210, namely, controls the driving shaft 1213 of the wing unit 1210 to unfold and rotate the propeller 1211.

According to this embodiment, after being launched from the housing 2000, the unmanned aerial vehicle 1000 is controlled to be stably landed on the ground, and then the wing unit 1210 is activated for a stable flight of the unmanned aerial vehicle 1000. When the unmanned aerial vehicle 1000 flies in response to the activation of the wing unit 1210, the first and second cameras 1121a and 1121b mounted on the unmanned aerial vehicle 1000 are activated to capture external environments. Hereinafter, the structures of the first and second cameras 1121a and 1121b will be described.

Figure 7A:
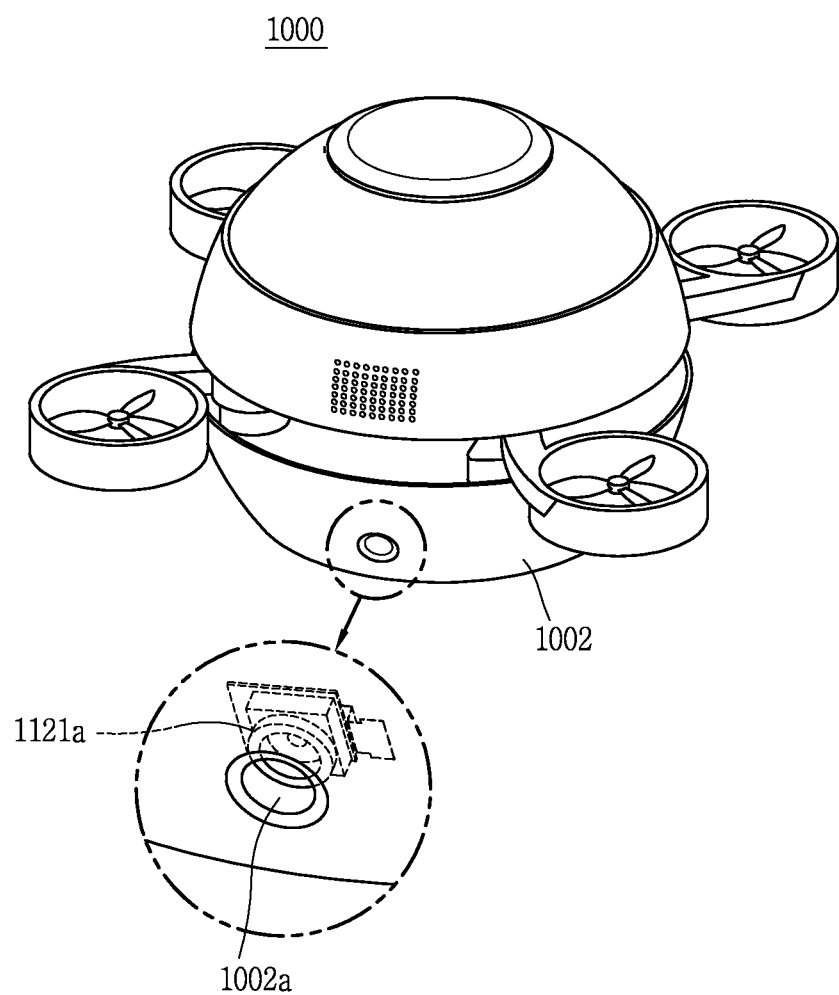
FIGS. 7A and 7B are conceptual views illustrating structures of cameras.
Figure 7B:
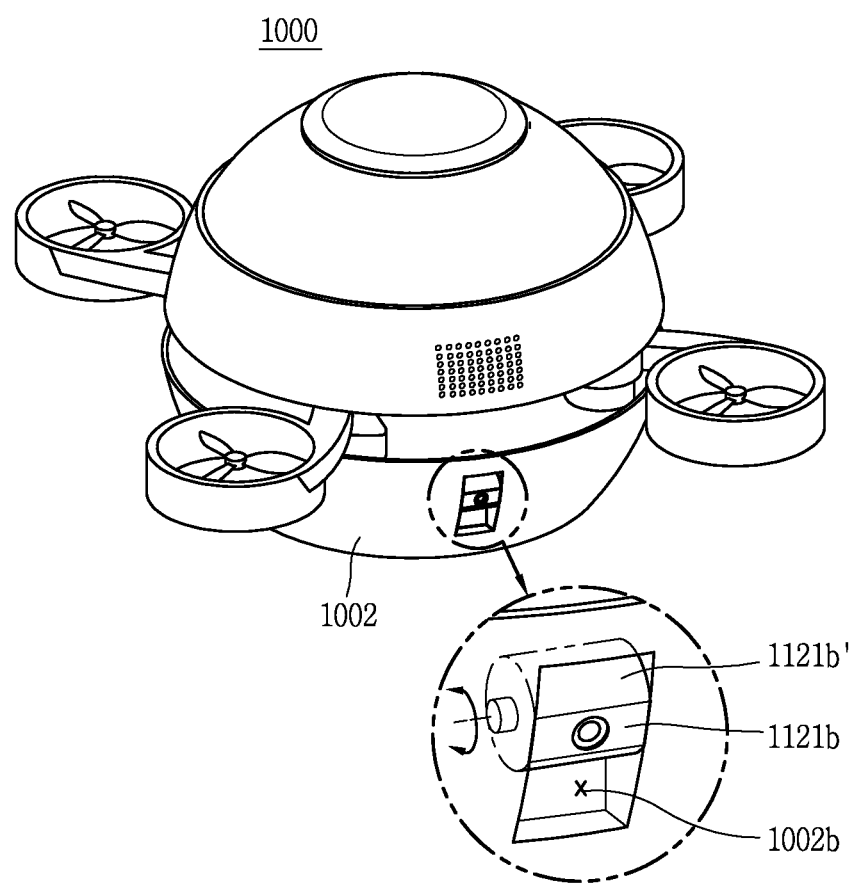

FIGS. 7A and 7B are conceptual views illustrating structures of the first and second cameras 1121a and 1121b.

As illustrated in FIG. 7A, the first camera 1121a is accommodated in the lower case 1002, which is adjacent to the lower cover 1005. The lower case 1002 may further include a camera hole 1002a formed on one portion thereof to correspond to the first camera 1121a. The first camera 1121a and the camera hole are located to face an area below the unmanned aerial vehicle 1000, such that the first camera 1121a can capture images of the lower area during the flight of the unmanned aerial vehicle 1000.

The first camera 1121a is configured to capture images of a specific region from the unmanned aerial vehicle 1000, and is not allowed to change its capturing range. The controller of the unmanned aerial vehicle 1000 may sense an external environment or determine a flight height of the unmanned aerial vehicle 1000 based on an image captured by the first camera 1121a.

As illustrated in FIG. 7B, the second camera 1121b is mounted to the lower case 1002 by a rotation fixing portion 1121b'. The lower case 1002 includes a mounting portion 1002b recessed into an outer surface thereof to fix the rotation fixing portion 1121b'.

The rotation fixing portion 1121b' is provided in one region of the mounting portion 1002b. The rotation fixing portion 1121b' has a cylindrical shape and includes a hinge protrusion. The hinge protrusion is fixed to the lower case 1002. The second camera 1121b is mounted to be exposed outside the rotation fixing portion 1121b'.

The controller of the unmanned aerial vehicle may control the rotation fixing portion 1121b' in a manner that a capturing angle of the second camera 1121b varies according to the height (altitude) of the unmanned aerial vehicle 1000. For example, when the altitude of the unmanned aerial vehicle 1000 gradually increases, the controller of the unmanned aerial vehicle 1000 may rotate the rotation fixing portion 1121b' such that the second camera 1121b can capture images of the ground.

The unmanned aerial vehicle 1000 may capture images of the ground at various angles during its flight, by means of the first and second cameras 1121a and 1121b. That is, while the first camera 1121a captures images of the external environment at a preset capturing angle, the second camera 1121b may be controlled to capture images of the external environment at different capturing angles according to the changes in the altitude of the unmanned aerial vehicle 1000.

Figure 8A:
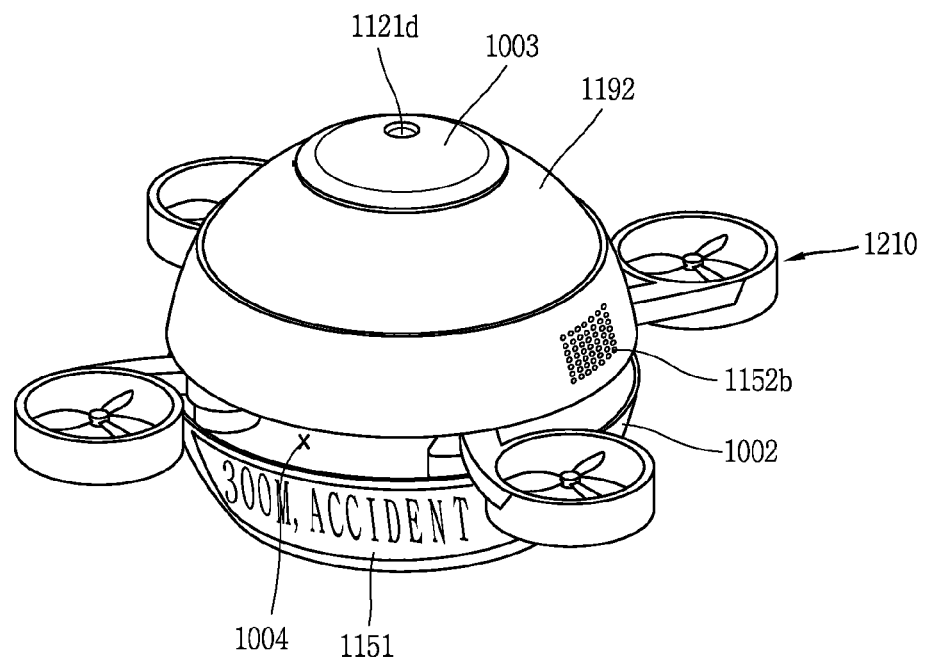
FIG. 8A is a conceptual view illustrating a camera and a display unit installed in the unmanned aerial vehicle.

FIG. 8A is a conceptual view illustrating a fourth camera 1121d and a display unit installed at an unmanned aerial vehicle.

As illustrated in FIG. 8A, the fourth camera 1121d is mounted on a top of the body part and covered by the upper cover 1003. The upper cover 1003 includes an opening through which one portion of the fourth camera 1121d is exposed. The fourth camera 1121d may capture images of an external environment while the unmanned aerial vehicle 1000 is mounted in the vehicle and accommodated in the housing 2000 or capture images of an external environment when the unmanned aerial vehicle 1000 fails a normal flight. That is, the fourth camera 1121d may be activated on the basis of a control command.

The controller of the unmanned aerial vehicle may set a flight altitude of the unmanned aerial vehicle 1000 on the basis of the external environment sensed by the fourth camera 1121d.

Meanwhile, the unmanned aerial vehicle 1000 according to one embodiment may further include a display unit 1151 to output visual information. The display unit 1151 may be disposed on one portion of the lower case 1002. The display unit 1151 is preferably located on a lower portion of the unmanned aerial vehicle 1000 to provide visual information to people who are present on the ground during the flight of the unmanned aerial vehicle 1000. However, the portion for providing the display unit 1151 may not be limited to the lower case 1002.

The display unit 1151 may be implemented as a light-emitting diode (LED). The display unit 1151 may output text or images or emit light of a preset color, in response to a specific control command. The visual information output on the display unit 1151 may allow for sensing the flight state of the unmanned aerial vehicle 1000 or provide information.

Figure 8B:
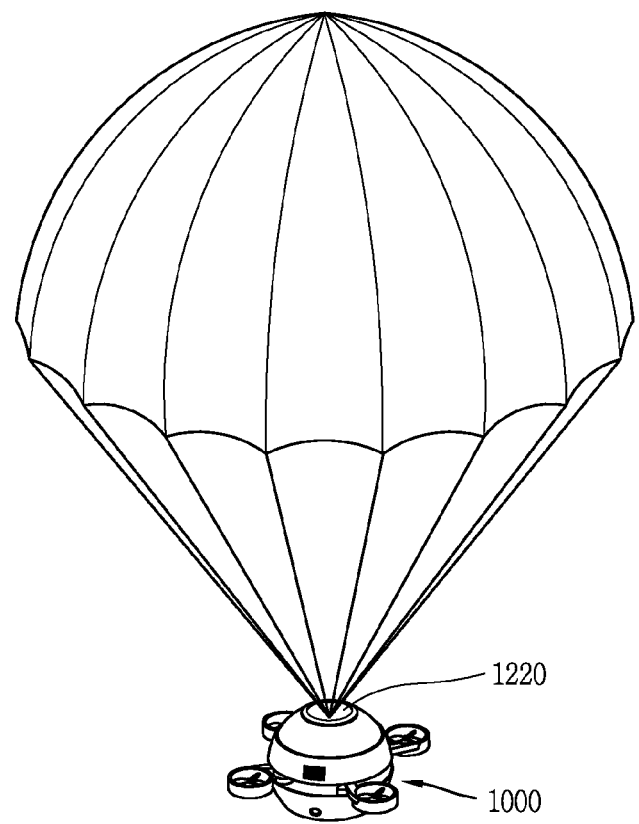
FIG. 8B is a conceptual view illustrating an activated state of a parachute unit.

FIG. 8B is a conceptual view illustrating an activated state of a parachute unit.

As illustrated in FIGS. 2 and 8B, the parachute unit 1220 is kept in an upper portion of the unmanned aerial vehicle 1000. The controller of the unmanned aerial vehicle controls the activation of the parachute unit 1220 based on a specific control command. For example, the specific control command may correspond to a case where the unmanned aerial vehicle 1000 tries to land on the ground during the flight, a case where a flight error is caused in the unmanned aerial vehicle 1000, and the like. Also, when an object is connected to the lower portion of the unmanned aerial vehicle 1000, the parachute unit 1220 may be activated when the unmanned aerial vehicle 1000 is landed in order to prevent damage of the object.

Figure 9A:
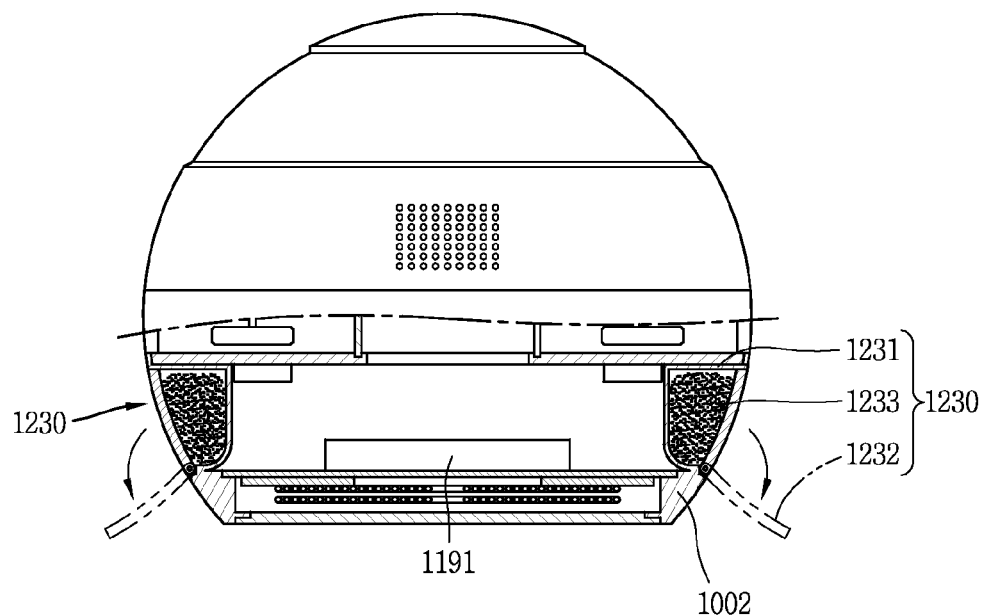
FIGS. 9A and 9B are conceptual views illustrating a fire-extinguishing unit stored in the unmanned aerial vehicle.
Figure 9B:
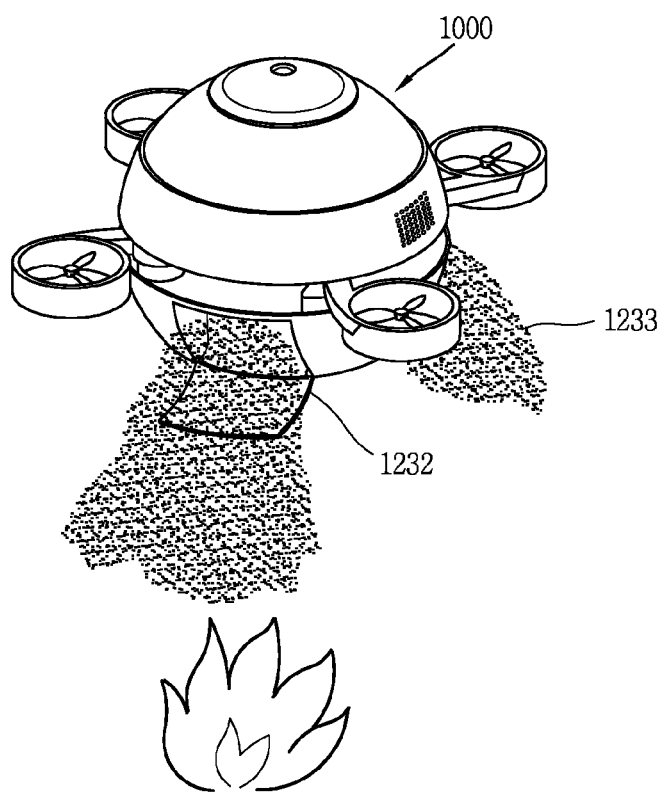

FIGS. 9A and 9B are conceptual views illustrating a fire-extinguishing unit 1230 accommodated in the unmanned aerial vehicle. As illustrated in FIG. 9A, the fire-extinguishing unit 1230 is located in the body part of the unmanned aerial vehicle 1000. The fire-extinguishing unit 1230 includes an accommodation region 1231, a hinge cover 1232 and an extinguishing material 1233. The accommodation region 1231 may be located in a lower portion of the body part of the unmanned aerial vehicle 1000. In detail, the accommodation region 1231 may be located adjacent to the power supply unit 1191 and the lower case 1002.

The extinguishing material 1233 is stored in the accommodation region 1231. Here, in order to put a fire out, the extinguishing material 1233 may contain a heat absorbent which transfers heat onto or into suppressant particles or droplets to improve an activation of the suppressant.

As illustrated in FIGS. 9A and 9B, the hinge cover 1232 defines an appearance of the unmanned aerial vehicle 1000. The hinge cover 1232 is configured to be open and closed in a rotating manner so as to expose the accommodation region 1231. When the outbreak of a fire is sensed while the unmanned aerial vehicle 1000 flies above the fire outbreak area, the controller controls the hinge cover 1232 to be open.

When the sensed fire is not so serious, the fire can be easily put out by use of the extinguishing material 1233 discharged from the unmanned aerial vehicle 1000.

Figure 10A:
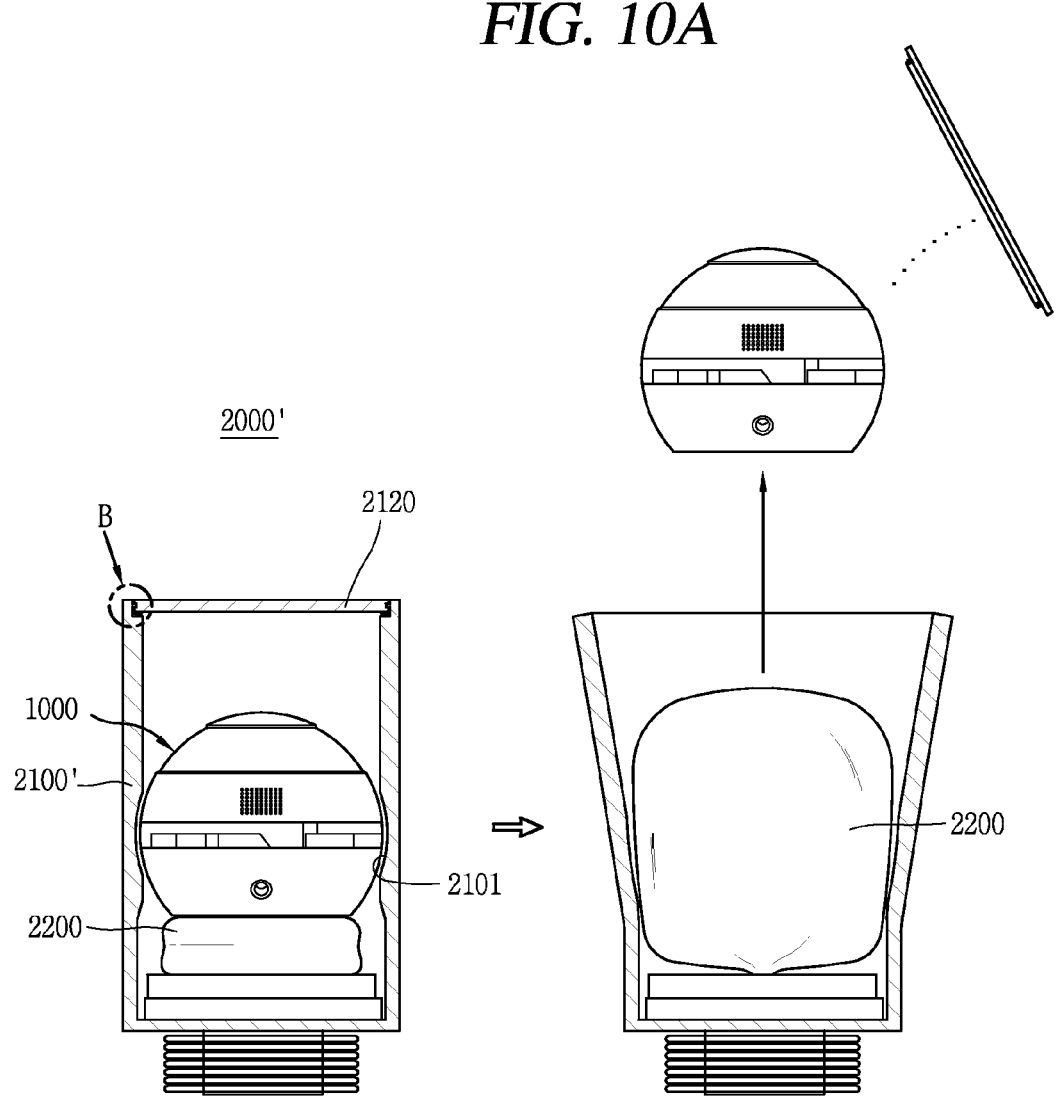
FIG. 10A is a conceptual view illustrating a structure of a housing for launching the unmanned aerial vehicle in accordance with another exemplary embodiment disclosed herein.
Figure 10B:
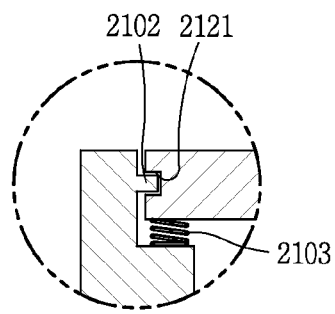
FIG. 10B is an enlarged view of a portion B of FIG. 10A.

FIG. 10A is a conceptual view illustrating a structure of a housing 2000' for launching an unmanned aerial vehicle in accordance with another exemplary embodiment of the present invention, and FIG. 10B is an enlarged view of a portion B of FIG. 10A.

As illustrated in FIG. 10A, a frame 2100' of the housing 2000' according to this embodiment includes a recess portion 2101 that is curved to support one side surface of the unmanned aerial vehicle 1000. The recess portion 2101 is formed to cover a part of an outer surface of the unmanned aerial vehicle 1000. The recess portion 2101 may allow the unmanned aerial vehicle 1000 to be stably kept in the housing 2000'. A diameter of a cross-section of the frame 2100' is smaller than a diameter of a cross-section of the unmanned aerial vehicle 1000. Accordingly, a diameter of a cross-section of the airbag unit 2200 is preferably smaller than the diameter of the cross-section of the unmanned aerial vehicle 1000.

The cover unit 2120 is mounted to an opening formed on the top of the frame 2100'. The frame 2100' is preferably formed of an elastic material to be deformable by an external force. When the airbag unit 2200 is inflated in response to a specific control command, the opening of the frame 2100' is expanded by a force such that the unmanned aerial vehicle 1000 is forcedly moved.

Accordingly, the cover unit 2120 which has been fixed to the opening is detached from the frame 2100'.

As illustrated in FIG. 10B, the frame 2100' includes a fixing protrusion 2102 formed adjacent to the opening, and the cover unit 2120 includes a fixing groove 2121 in which the fixing protrusion 2102 is inserted. Also, the frame 2100' further includes an elastic portion 2103 elastically supporting a gap between a stepped portion on which the cover unit 2120 is mounted and the cover unit 2120. The elastic portion 2103 provides an elastic force to the cover unit 2120 such that the cover unit 2120 is detached from the frame 2100'.

While the unmanned aerial vehicle 1000 is kept in the housing 2000', the cover unit 2120 is fixed to the frame 2100' by the fixing protrusion 2102 and the fixing groove 2121. Here, when the frame 2100' is expanded in response to the movement of the unmanned aerial vehicle 1000, the fixing protrusion 2102 is separated from the fixing groove 2121, and accordingly the cover unit 2120 is detached from the frame 2100' by the elastic portion 2103.

The cover unit 2120 is detached from the frame 2100' prior to coming in contact with the unmanned aerial vehicle 1000. Therefore, since the unmanned aerial vehicle 1000 is prevented from colliding with the cover unit 2120 to be launched outward, the damage of the unmanned aerial vehicle 1000 which is likely to be caused at the launching moment can be minimized.

Figure 11:
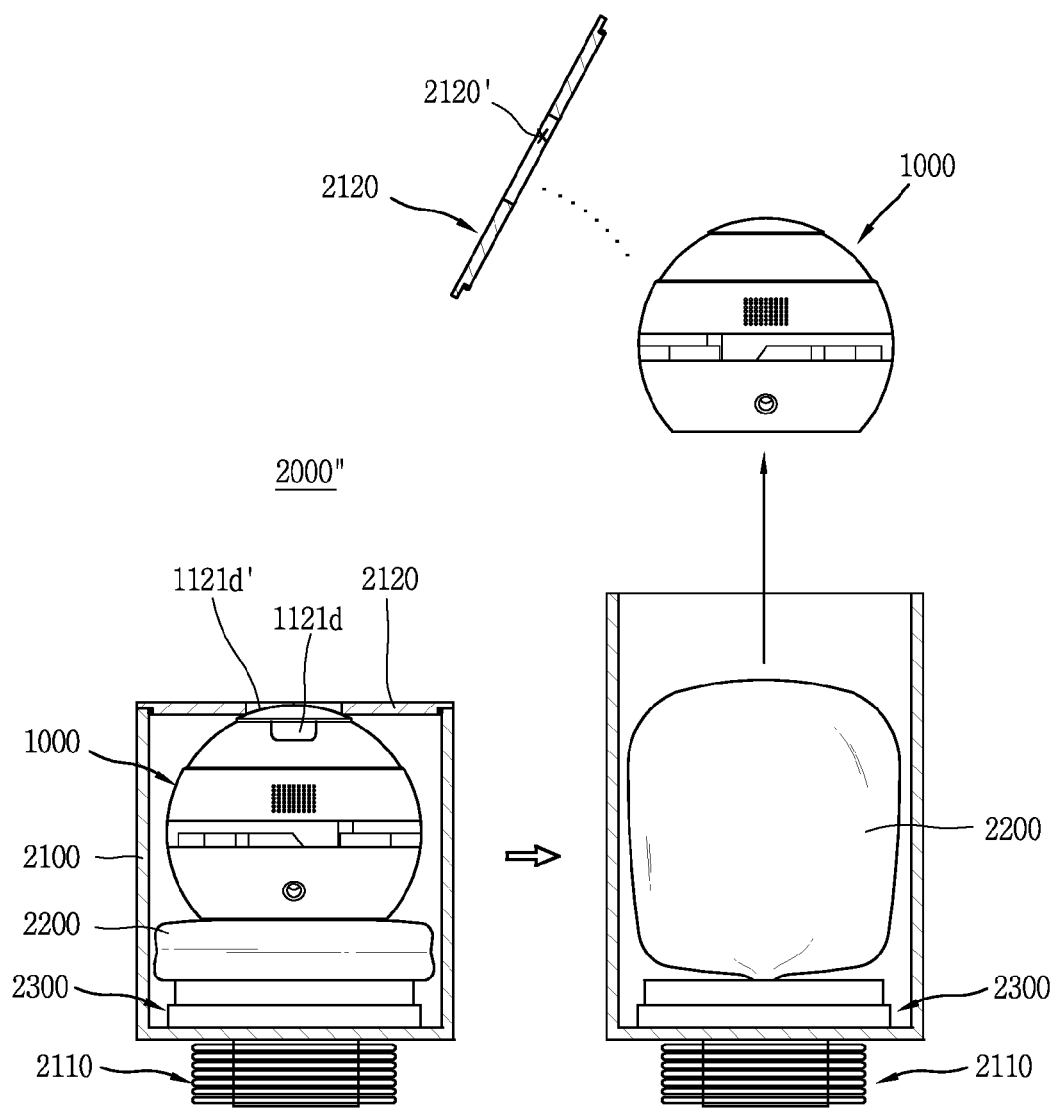
FIG. 11 is a conceptual view illustrating a housing for accommodating the unmanned aerial vehicle in accordance with another exemplary embodiment of the present invention.

FIG. 11 is a conceptual view illustrating a housing 2000" for accommodating the unmanned aerial vehicle in accordance with another exemplary embodiment of the present invention. As illustrated in FIG. 11 and FIG. 8A, the fourth camera 1121d is mounted on the top of the unmanned aerial vehicle 1000. The cover unit 2120 mounted to the frame 2100 includes an opening 1121d' through which the fourth camera 1121d is externally exposed.

When the unmanned aerial vehicle 1000 is disposed on the airbag unit 2200 prior to the airbag unit 2200 being inflated, one region of the cover unit 2120 is coupled to the frame 2100 in a manner that the opening 1121d' and the fourth camera 1121d overlap each other. That is, no extra space exists within the upper portion of the unmanned aerial vehicle 1000.

The fourth camera 1121d may capture an external environment through the opening 1121d'. Also, since the unmanned aerial vehicle 1000 is secured by the cover unit 2120, the unmanned aerial vehicle 1000 can be more stably accommodated in the housing 2000".

When the airbag unit 2200 is inflated, the cover unit 2120 is detached and the unmanned aerial vehicle 1000 is launched outward.

Figure 12:
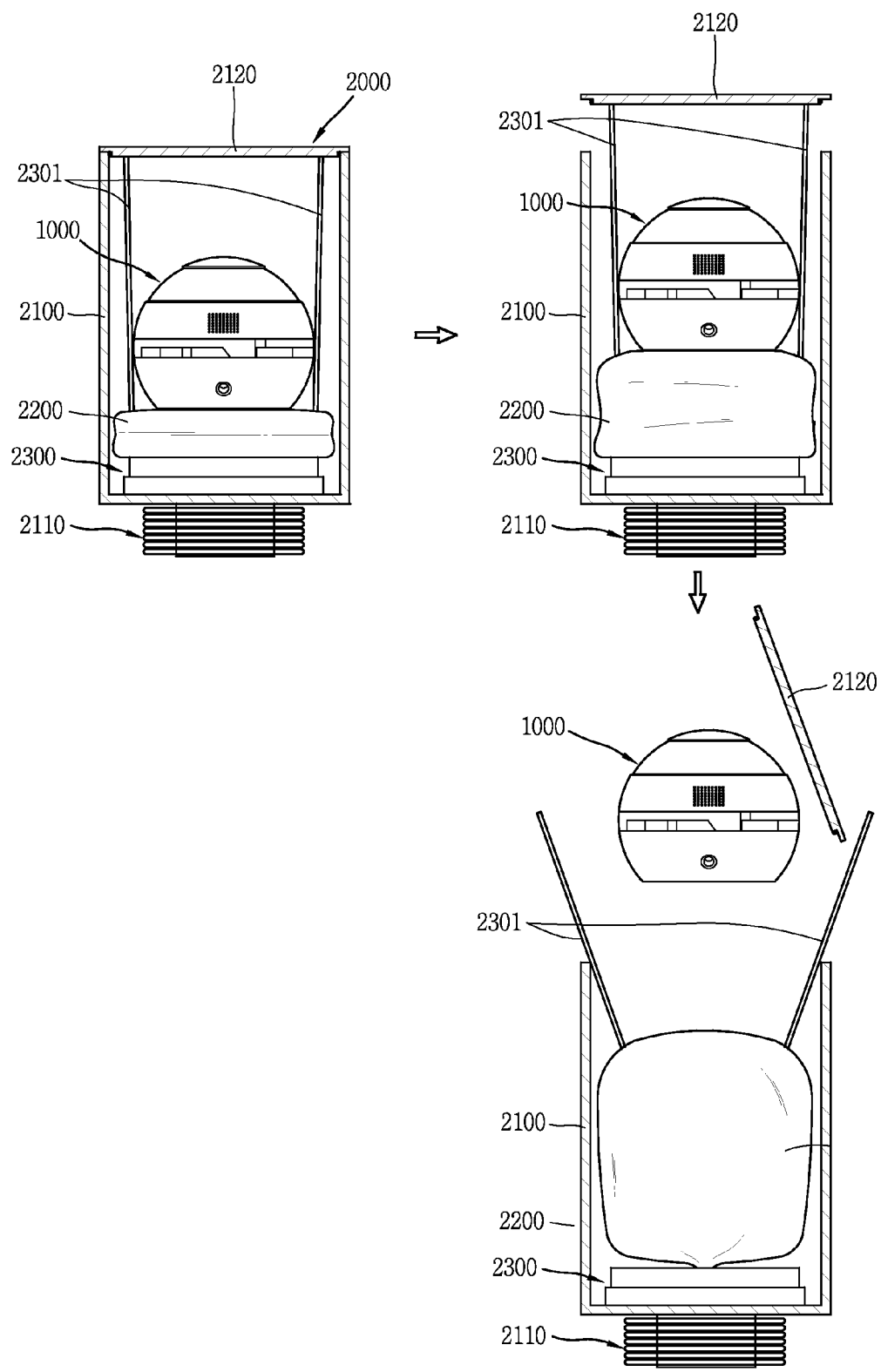
FIG. 12 is a conceptual view illustrating a structure of a housing for accommodating the unmanned aerial vehicle in accordance with another exemplary embodiment disclosed herein.

FIG. 12 is a conceptual view illustrating a structure of a housing 2000 for accommodating an unmanned aerial vehicle in accordance with another exemplary embodiment of the present invention.

The housing 2000 according to this embodiment further includes a supporting rod 2301 supporting a space between the airbag unit 2200 and the cover unit 2120. The supporting rod 2301 may extend along a lengthwise direction of the housing 2000, and have one end adhered onto the airbag unit 2200. The supporting rod 2301 may be provided in plurality. The supporting rod 2301 may be configured to support a side surface of the unmanned aerial vehicle 1000. When the supporting rod 2301 is provided in plurality, the unmanned aerial vehicle 1000 can be more stably accommodated in the housing 2000 by the supporting rods 2301.

When the airbag unit 2200 is inflated, the supporting rods 2301 push the cover unit 2120 out. Since the supporting rods 2301 support the cover unit 2120 from before the airbag unit 2200 is inflated, the supporting rods 2301 move the cover unit 2120 before the unmanned aerial vehicle 1000 reaches the cover unit 2120.

When the cover unit 2120 is detached from the supporting rods 2301, the supporting rods 2301 are spread out from one another. Accordingly, the unmanned aerial vehicle 1000 can be launched without contacting the supporting rods 2301 and the cover unit 2120.

According to this embodiment, the unmanned aerial vehicle 1000 can be launched without collision with the cover unit 2120, which may result in minimization of damage of the unmanned aerial vehicle 1000 due to the collision.

Figure 13:
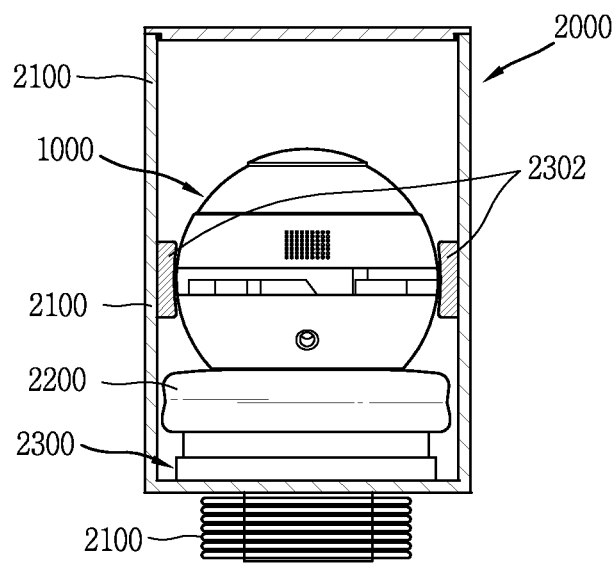
FIG. 13 is a conceptual view illustrating a structure of a housing for accommodating the unmanned aerial vehicle in accordance with another exemplary embodiment of the present invention.

FIG. 13 is a conceptual view illustrating a structure of a housing 2000 for accommodating an unmanned aerial vehicle in accordance with another exemplary embodiment of the present invention. The housing 2000 according to this embodiment further includes a control supporting member 2302 that supports a gap between the frame 2100 and the unmanned aerial vehicle 1000 and controls the launch of the unmanned aerial vehicle 1000.

A surface of the control supporting member 2302 which comes in contact with the unmanned aerial vehicle 1000 may be formed curved to correspond to the outer surface of the unmanned aerial vehicle 1000. Although not illustrated in detail, the control supporting member 2302 is movably disposed on an inner surface of the frame 2100 so as to protrude from the frame 2100 or be inserted into the frame 2100.

That is, the control supporting member 2302 may support the outer surface of the unmanned aerial vehicle 1000 firmly or loosely. The control supporting member 2302 may firmly support the outer surface of the unmanned aerial vehicle 1000 to restrict the launch of the unmanned aerial vehicle 1000 or control a launching speed of the unmanned aerial vehicle 1000.

That is, when the unmanned aerial vehicle 1000 is firmly fixed by the control supporting member 2302, the unmanned aerial vehicle 1000 may not be launched or may be launched at a reduced speed even if a force is applied thereto by the airbag unit 2200.

According to this embodiment, the launch of the unmanned aerial vehicle can be limited or prevented or the launching speed thereof can be controlled under a specific situation.

The aforementioned unmanned aerial vehicle performs various functions by being launched from the housing in response to a specific control command. Hereinafter, a method for controlling the unmanned aerial vehicle launched in response to the control command will be described.

Figure 14A:
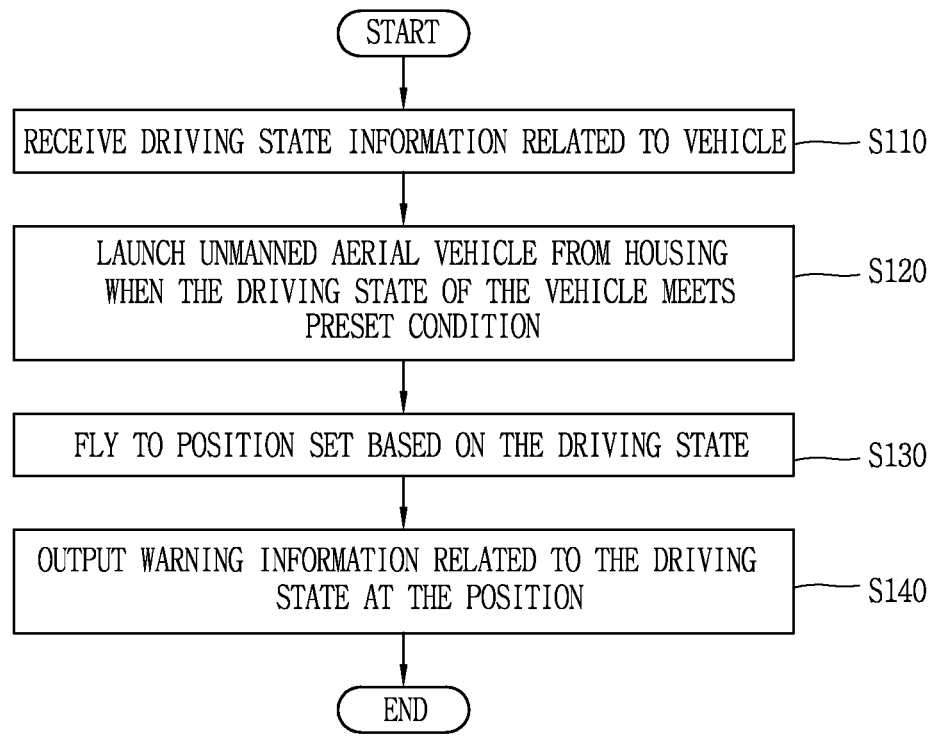
FIG. 14A is a flowchart illustrating a method for controlling an unmanned aerial vehicle in accordance with one exemplary embodiment of the present invention.

FIG. 14A is a flowchart illustrating a method for controlling an unmanned aerial vehicle 1000 in accordance with one exemplary embodiment disclosed herein. The unmanned aerial vehicle 1000 kept in the housing 2000 is mounted in another vehicle 10 (see FIG. 3A). The wireless communication unit of the unmanned aerial vehicle 1000 receives driving state (or moving state) information related to the vehicle (S110).

The wireless communication unit of the unmanned aerial vehicle 1000 may include a plurality of wireless communication modules that are located in the unmanned aerial vehicle 1000 or in the housing 2000 and the unmanned aerial vehicle 1000 to mutually transmit and receive wireless signals. The wireless communication unit may include at least one of a mobile communication module, an Internet module, a short-range communication module, and a location information module.

The mobile communication module can transmit and receive wireless signals to and from one or more network entities. Typical examples of the network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000, Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-Advance (LTE-A), and the like).

Examples of wireless signals may include audio call signals, video (telephony) call signals, or various formats of data to support communication of text and multimedia messages.

The wireless Internet module is configured to facilitate wireless Internet access. This module may be internally or externally coupled to the unmanned aerial vehicle 1000. The wireless Internet module may transmit and receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), LTE-Advance (LTE-A), and the like. The wireless Internet module may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 which performs such wireless Internet access through the mobile communication network may be understood as a type of mobile communication module.

The short-range communication module is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee™' Near Field Communication (NFC), Wireless-Fidelity (Wi-Fi), Wi-Fi Direct and Wireless USB. One example of the wireless area networks may be a wireless personal area network.

The short-range communication module may sense or recognize a wearable device, and permit communication between the wearable device and the unmanned aerial vehicle 1000. In addition, when the sensed wearable device is a device which is authenticated to communicate with the unmanned aerial vehicle 1000, at least part of data processed in the unmanned aerial vehicle 1000 can be transmitted to the wearable device via the short-range communication module.

The location information module is generally configured to obtain a position (or a current position) of the unmanned aerial vehicle 1000. As an example, the location information module includes a Global Position System (GPS) module or a Wi-Fi module. As one example, when the unmanned aerial vehicle 1000 uses the GPS module, a position of the unmanned aerial vehicle 1000 may be acquired using a signal sent from a GPS satellite. As another example, when the unmanned aerial vehicle 1000 uses the Wi-Fi module, a position of the unmanned aerial vehicle 1000 can be acquired based on information related to a wireless access point (AP) which transmits or receives a wireless signal to or from the Wi-Fi module. The location information module is a module which is used for obtaining the position (or the current position) of the unmanned aerial vehicle 1000, and may not be limited to a module which directly calculates or obtains such position.

Here, the driving state of the vehicle 10 may include various types of information collected while the vehicle is driven. Examples of the driving state of the vehicle may include a driving speed (or moving speed), a moving direction, a driving area, specific driving information received from the driving area, a route to a preset destination and the like.

The wireless communication unit may receive the driving state information at a preset time interval.

When the driving state of the vehicle meets a preset condition, the unmanned aerial vehicle 1000 is launched from the housing 2000 (S120). After the launch, the unmanned aerial vehicle 1000 may be landed on a specific ground surface or fly above the vehicle 10.

Additionally referring to FIGS. 4 and 5, when the preset condition is met, the controller activates the ignition portion 2222 and thus controls the airbag 2210 to be inflated by gas. Although not illustrated in detail, when an additional condition and a user's control command for restricting the launch of the unmanned aerial vehicle 1000 are applied, the airbag 2210 may be restricted from being inflated.

When the driving state meets the preset condition, a control command for launching the unmanned aerial vehicle 1000 is generated. The control command may be generated by the controller of the unmanned aerial vehicle.

The unmanned aerial vehicle 1000 flies toward a position which is set on the basis of the driving state (S130). That is, a destination to which the unmanned aerial vehicle 1000 has to fly may be set based on the received driving state information. For example, the position may correspond to a position away from the vehicle 10 by a predetermined distance, a specific area in a driven distance of the vehicle, an area adjacent to another vehicle following behind the vehicle, an upper area away from the vehicle by a specific height, a specific area, a preset destination and the like.

Warning information related to the driving state is output at the position (S140). The warning information related to the driving state is output toward another vehicle following behind the vehicle 10, another person located near the vehicle, a driver of the vehicle, or a control center designated to receive the warning information.

Although not illustrated in detail, the unmanned aerial vehicle 1000 may be controlled to be accommodated back into the housing 2000 on the basis of an additional control command. Also, the unmanned aerial vehicle 1000 may be accommodated back into the housing 2000 by a user's direct transport.

However, the present invention may not be limited to this. The unmanned aerial vehicle 1000 may also be launched from the housing 2000 on the basis of a control command which is separately applied by a driver.

That is, the unmanned aerial vehicle is launched from the vehicle 10 in response to a specific control command and outputs warning information at an appropriate position. Hereinafter, a detailed embodiment of outputting the warning information will be described.

Figure 14B:
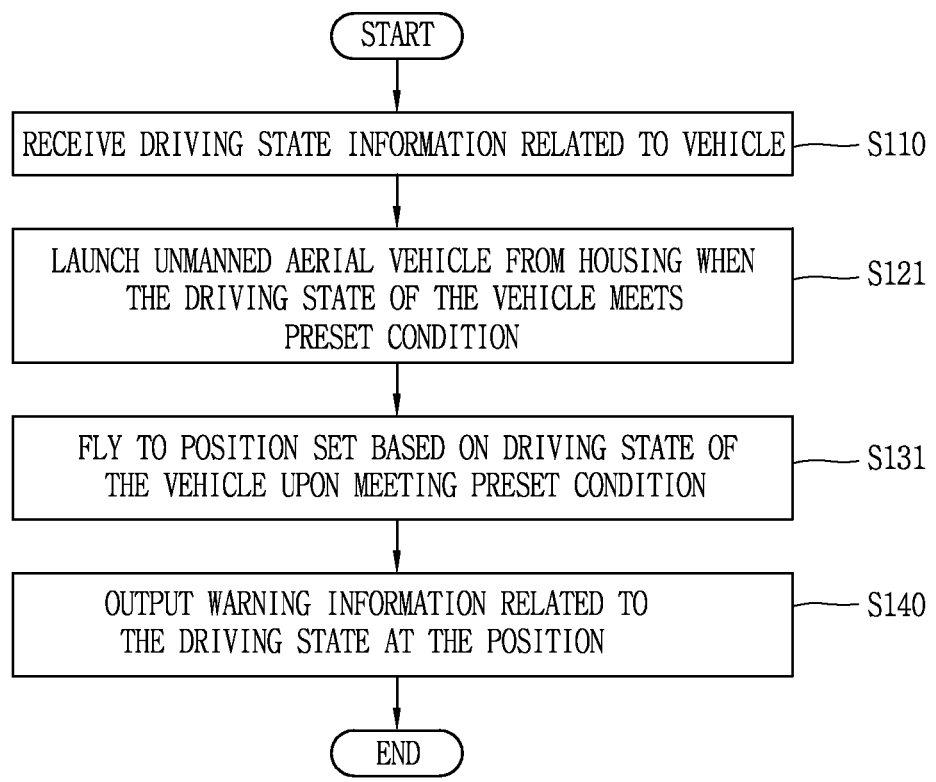
FIG. 14B is a flowchart illustrating a method for controlling an unmanned aerial vehicle when an impact is caused.
Figure 14C:
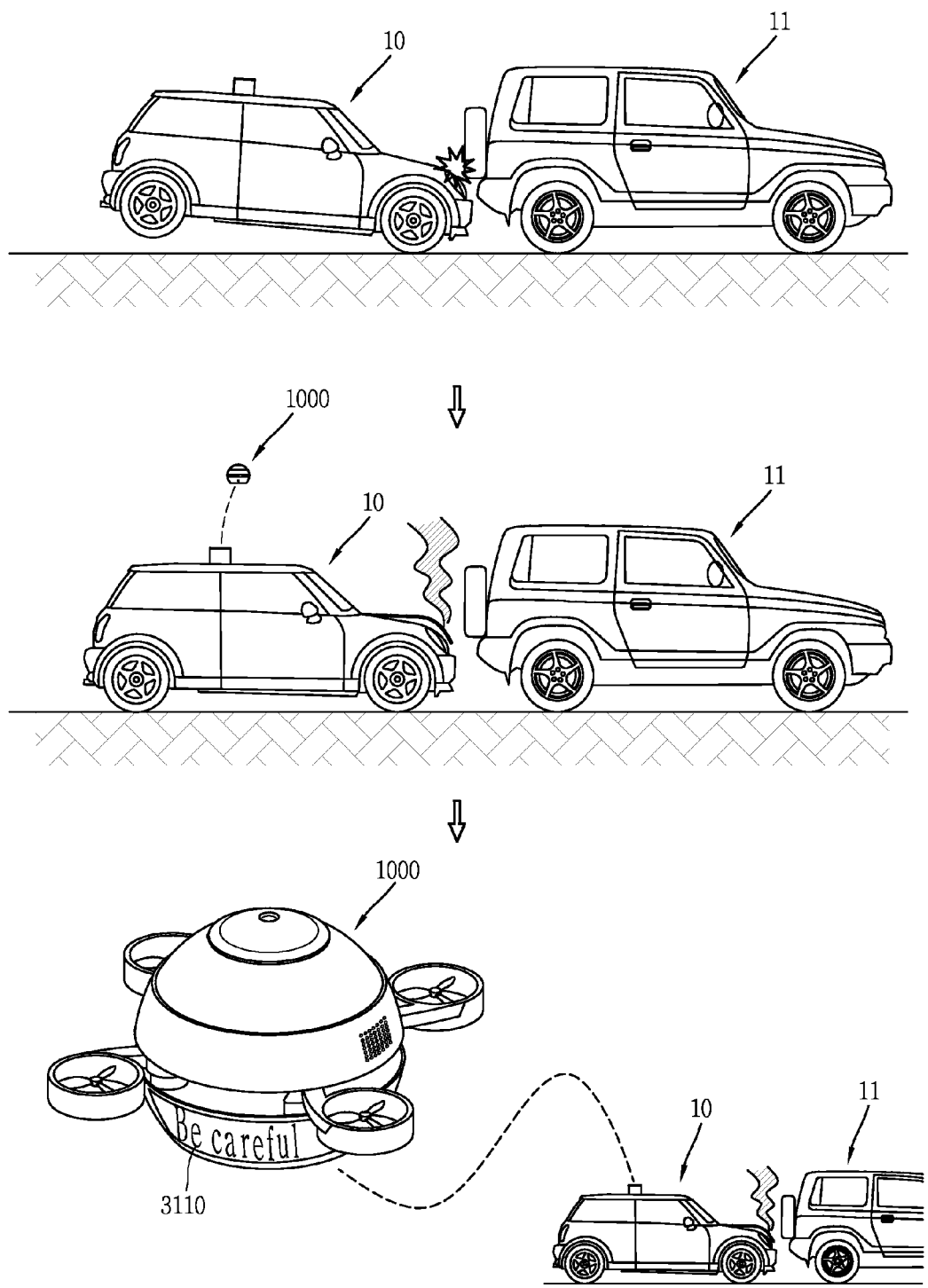
FIG. 14C is a conceptual view illustrating the control method according to the embodiment of FIG. 14B.

FIG. 14B is a flowchart illustrating a method for controlling an unmanned aerial vehicle that is launched when an impact is generated, and FIG. 14C is a conceptual view illustrating the control method according to the embodiment of FIG. 14B.

As illustrated in FIGS. 14B and 14C, the wireless communication unit of the unmanned aerial vehicle 1000 receives driving state information related to the vehicle 10 (S110).

When the driving state of the vehicle 10 meets a preset condition, the controller launches the unmanned aerial vehicle 1000 from the housing 2000 (S120). For example, when an impact is generated due to the vehicle 10 being crashed into another vehicle 11 located in front of the vehicle, the preset condition is met. However, the preset condition may not be limited to this. The preset condition may also include any case, such as a sudden stop, a collision of the vehicle 10 with an external object, a sudden change of the driving state of the vehicle due to an external force, and the like, as well as the accident (rear-end collision, crash) with another vehicle.

The controller controls the unmanned aerial vehicle to fly to the position set on the basis of the driving state of the vehicle at the moment the preset condition is met (S131). Here, the driving state at the moment the preset condition is met may include information on an area in which the vehicle is located upon meeting the preset condition, a position of the vehicle on a road upon meeting the preset condition, a driving speed of the vehicle, a driving direction of the vehicle, a presence of another vehicle following behind the vehicle, a relative speed of the following vehicle (rear vehicle), and the like.

For example, when a vehicle following behind the vehicle 10 is present, the set position may correspond to an area at which the rear vehicle (the following vehicle) is expected to be located or a rear area spaced apart from the vehicle 10 by a specific distance. That is, the controller controls the wing unit 1210 such that the unmanned aerial vehicle 100 can fly opposite to the moving direction of the vehicle 10 on the basis of the driving state.

Warning information related to the driving state is output at the position (S140). Here, the warning information may correspond to information notifying an accident of the vehicle, information for inducing safe driving due to the accident, and the like.

Referring to FIG. 14C, the unmanned aerial vehicle 1000 launched from the vehicle 10 which is involved in an accident with another vehicle 11 flies to the rear of the vehicle 10 on the basis of the driving state information. When the unmanned aerial vehicle 1000 flies adjacent to the rear of the vehicle 10, namely, to the following vehicle, a warning image 3110 may be output through the display unit 1151. The controller controls the wing unit 1210 such that the unmanned aerial vehicle 1000 can fly opposite to the moving direction of the vehicle 10 on the basis of the driving state.

A driver of the rear vehicle may thus reduce a driving speed in response to the warning image 3110 output by the unmanned aerial vehicle 1000 or change a driving direction to prevent a secondary rear-end collision. Also, when receiving information on the accident, the driver of the rear vehicle may notify (report) the accident for bringing it under control.

In this manner, when an impact is generated in the vehicle 10 due to an accident, the unmanned aerial vehicle 1000 equipped in the vehicle is launched. A position to which the unmanned aerial vehicle is to fly is set based on collected driving state information, and warning information to be output at the set position is generated. Accordingly, another vehicle following behind the vehicle can be warned even without a user's separate control command, which may result in prevention of a secondary accident.

Specifically, when a driver involved in a traffic accident is not in a condition of notifying the accident to others, the unmanned aerial vehicle is automatically launched and is controlled based on the collected driving state information without a control command. This may facilitate the state of the vehicle to be notified to the others.

Figure 14D:
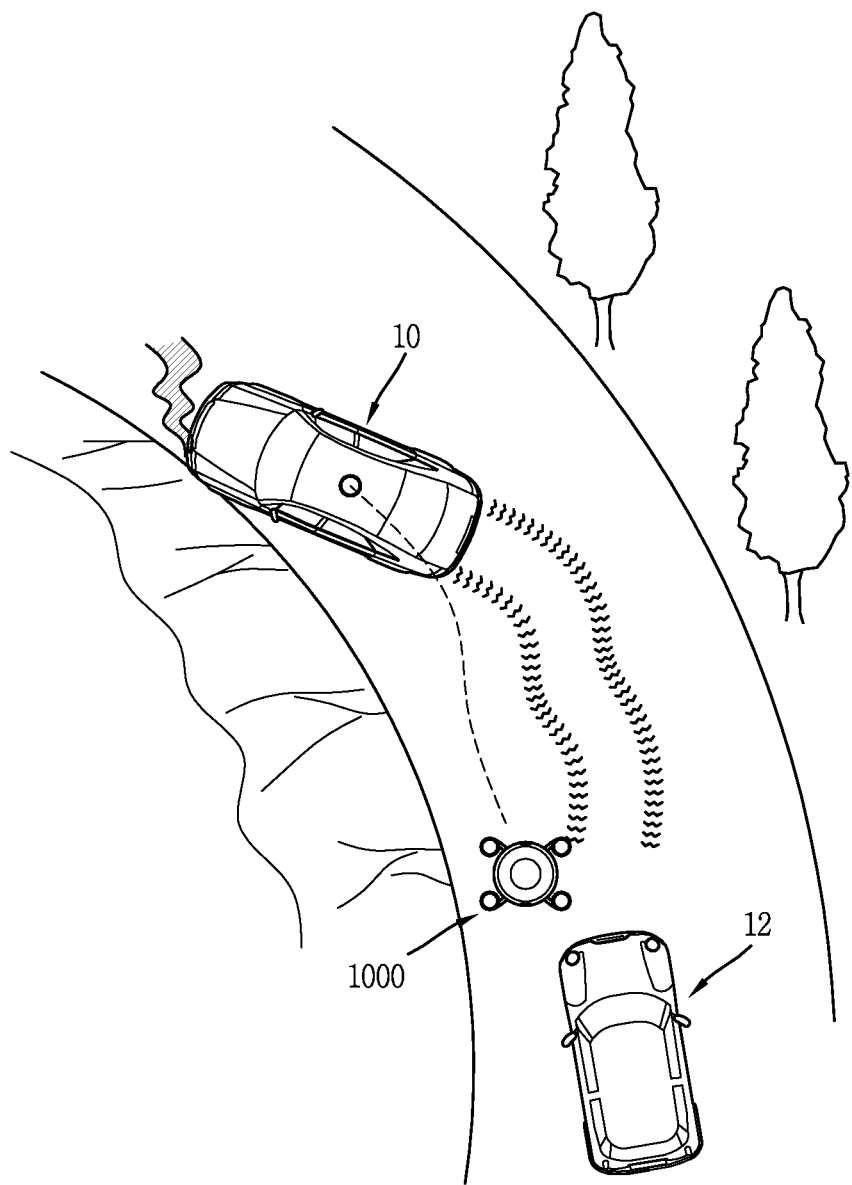
FIG. 14D is a conceptual view illustrating a method for controlling an unmanned aerial vehicle according to an ambient environment of another vehicle in accordance with another exemplary embodiment disclosed herein.

FIG. 14D is a conceptual view illustrating a method for controlling an unmanned aerial vehicle according to an ambient environment of a vehicle in accordance with another exemplary embodiment disclosed herein. FIG. 14D illustrates a situation that a vehicle 10 moving around a curve is involved into an accident.

The unmanned aerial vehicle 1000 is launched based on driving state information related to an impact caused due to the accident. The driving state information includes information related to a state that the vehicle 10 has moved around the curve.

The controller may set a position to which the unmanned aerial vehicle 1000 is to fly on the basis of the information on the moving state (driving state) around the curve. The controller controls the unmanned aerial vehicle 1000 to fly toward a rear vehicle 12 following behind the vehicle 10 on the curve. The controller controls the wing unit 1210 such that the unmanned aerial vehicle 1000 can fly opposite to the moving direction of the vehicle 10 on the basis of the driving state.

In this instance, a position of the rear vehicle 12 may be calculated according to the information related to the curve, a driving speed of the vehicle 10 and the driving direction of the vehicle 10. At an area, such as the curve, at which the rear vehicle 12 cannot detect the vehicle 10 moving ahead of it, when the unmanned aerial vehicle 1000 is launched due to a collision, the controller sets a position for the unmanned aerial vehicle 1000 to fly by use of information related to an ambient environment that the vehicle 10 moves as well as the driving state information.

Also, the controller may additionally set a flight orbit of the unmanned aerial vehicle 1000 according to the ambient environment. For example, the unmanned aerial vehicle 1000 may not fly linearly to reach a set position. When the unmanned aerial vehicle 1000 is launched while the vehicle 10 moves around a curve, the flight orbit may be set to correspond to the curve. This may minimize a possible accident of the unmanned aerial vehicle 1000, which is caused due to a collision against another object, such as a tree or the like.

The unmanned aerial vehicle 1000 which has reached the set position outputs warning information in various ways. Hereinafter, various embodiments of outputting the warning information will be described.

FIGS. 15A to 15D are conceptual views illustrating a method of outputting warning information in accordance with different exemplary embodiments of the present invention. The warning information may correspond to brief information related to an accident to be notified to other drivers, simple warning information to induce careful driving, information including a guide for another path, and the like.

Figure 15A:
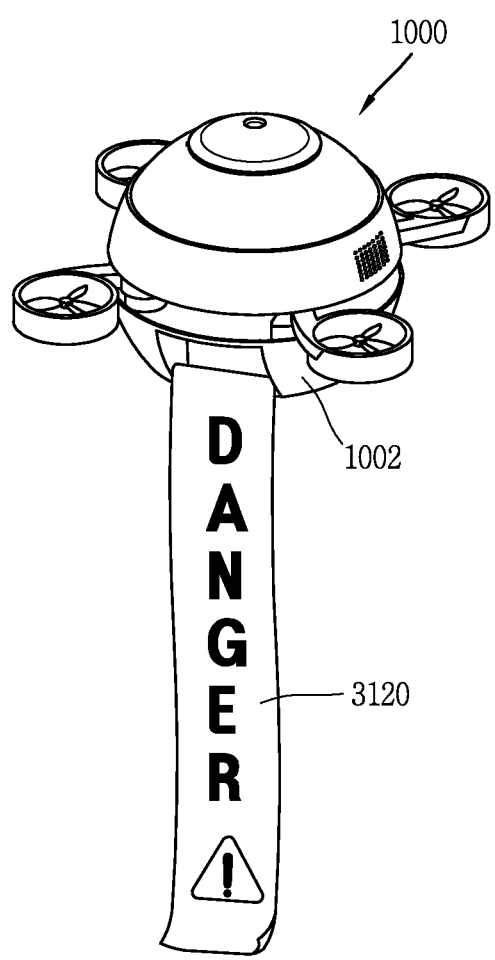
FIGS. 15A, 15B, 15C and 15D are conceptual views illustrating a method of outputting warning information in accordance with different exemplary embodiments disclosed herein.

As illustrated in FIG. 15A, the warning information is output in the form of a placard shape 3120. The placard 1320 includes specific visual information. The placard 1320 may be stored in the lower case 1002.

The controller controls the lower case 1002 such that the placard 3120 is unfolded outward at a specific height above the set position. The visual information included in the placard 3120 may be varied by a user.

Meanwhile, although not illustrated in detail, the placard 3120 may be implemented as a flexible display. The flexible display may be accommodated in the lower case 1002 in a rolled state and then exposed with being unrolled at the set position. Also, the controller may generate the visual information to be output on the flexible display on the basis of the driving state information.

The placard 3120 which is open in the sky may effectively provide warning information to people and other vehicles nearby the vehicle 10.

Figure 15B:
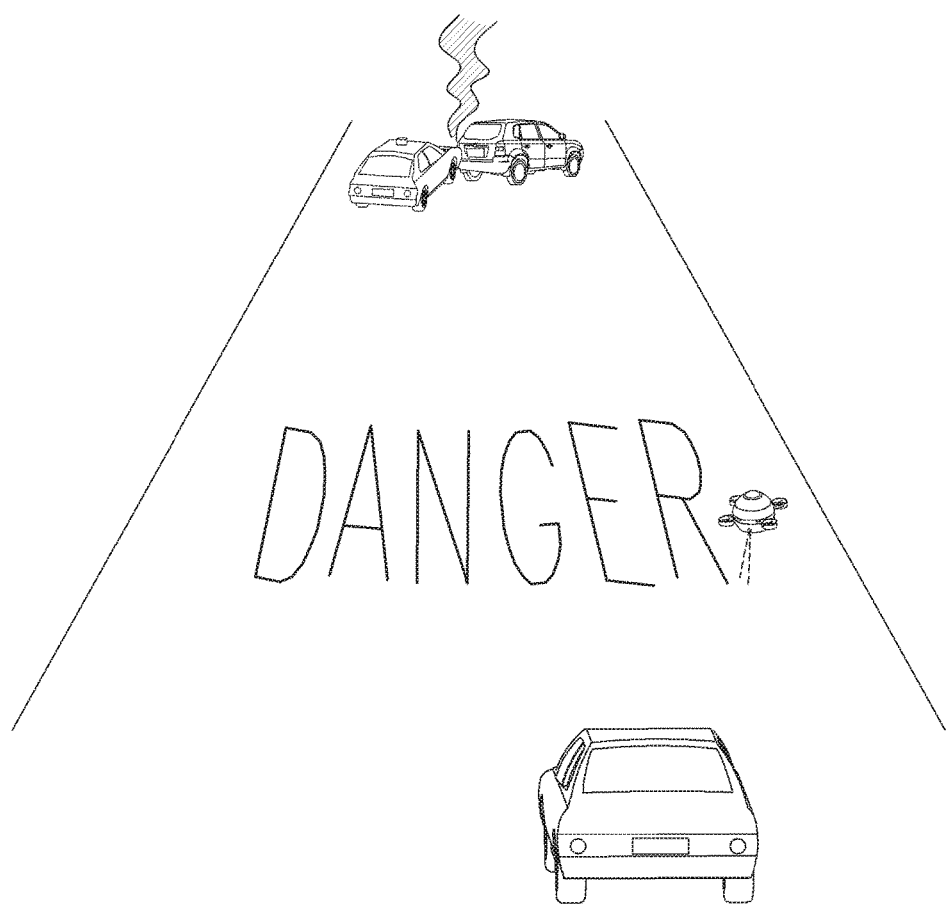

Referring to FIG. 15B, the unmanned aerial vehicle 1000 outputs warning information using a paint sprayed out therefrom. The paint is coated on a road and forms a solid film. The unmanned aerial vehicle 1000 according to this embodiment further includes a paint spraying unit (not illustrated) that is disposed in the lower portion of the body part to spray the paint out. The controller forms print orbit information to output the warning information based on the driving state information when the unmanned aerial vehicle 1000 reaches the set position.

The controller controls the paint to be sprayed out when the unmanned aerial vehicle 1000 flies on the basis of the print orbit information. The print orbit is formed to print text or display an image as the warning information. The warning information may be output on the ground (road) on which the vehicle has moved by the unmanned aerial vehicle 1000 flown along the print orbit.

Accordingly, the warning information can be provided to every vehicle which checks the road while moving behind the vehicle 10.

Figure 15C:
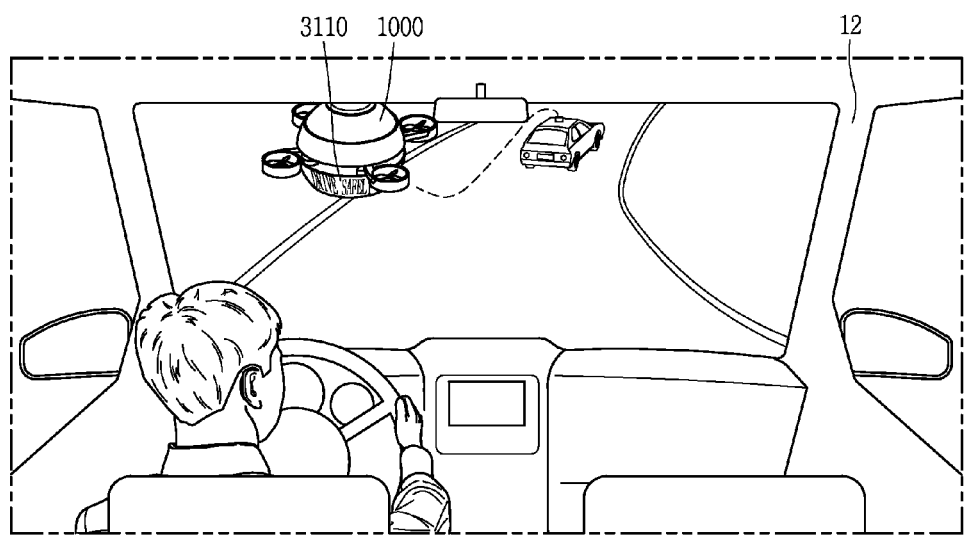

Referring to FIG. 15C, the controller controls the wing unit 1210 such that the unmanned aerial vehicle 1000 flies to the front of the rear vehicle 12 following behind the vehicle 10. When the unmanned aerial vehicle 1000 has flown to the front of the rear vehicle 12, the controller controls the display unit 1151 to output the warning information.

The controller also controls the unmanned aerial vehicle 1000 to output the warning information while staying above the set position for a preset time. When there are a plurality of vehicles nearby the vehicle 10, the controller controls the wing unit 1210 to fly toward another vehicle, and controls the display unit to output the warning information even above an area adjacent to the another vehicle for the preset time.

The unmanned aerial vehicle 1000 may control the display unit to continuously output the warning information at the set position. In this instance, the set position at which the unmanned aerial vehicle 1000 flies is preferably set to an area at which the unmanned aerial vehicle 100 does not interfere with the driving of the vehicle.

Figure 15D:
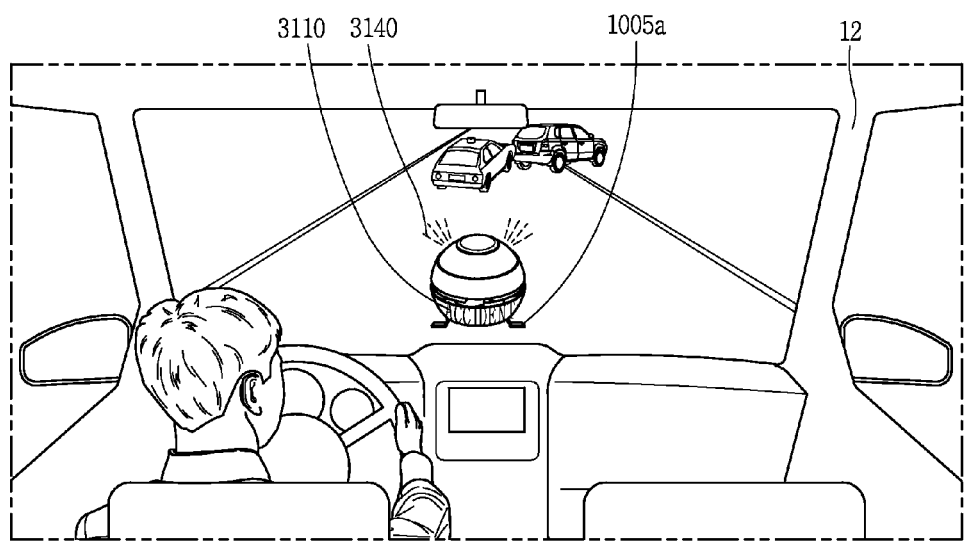

Referring to FIG. 15D, the unmanned aerial vehicle 1000 is landed on the ground while outputting the warning information. A set position according to this embodiment corresponds to one area of a road along which the rear vehicle 12 following behind the vehicle 10 is driving, and is preferably set to an area at which a driver of the rear vehicle can recognize an accident involved with the vehicle 10.

The unmanned aerial vehicle 1000 according to this embodiment may further include a supporting member 1005*a* protruding therefrom. The supporting member 1005*a* may allow the unmanned aerial vehicle 100 to be landed on the ground at a preset height. The supporting portion 1005*a* is configured to protrude from the lower cover 1005 if necessary.

While landed on the ground, the unmanned aerial vehicle 1000 may output visual information through the display unit 1151, and output warning information 3140 which includes audible data through the first and second audio output modules 1152*a* and 1152*b*.

The unmanned aerial vehicle 1000 may selectively use various ways of outputting the warning information according to the driving state information and the set position, and also output the warning information by selecting two or more output methods.

Figure 16A:
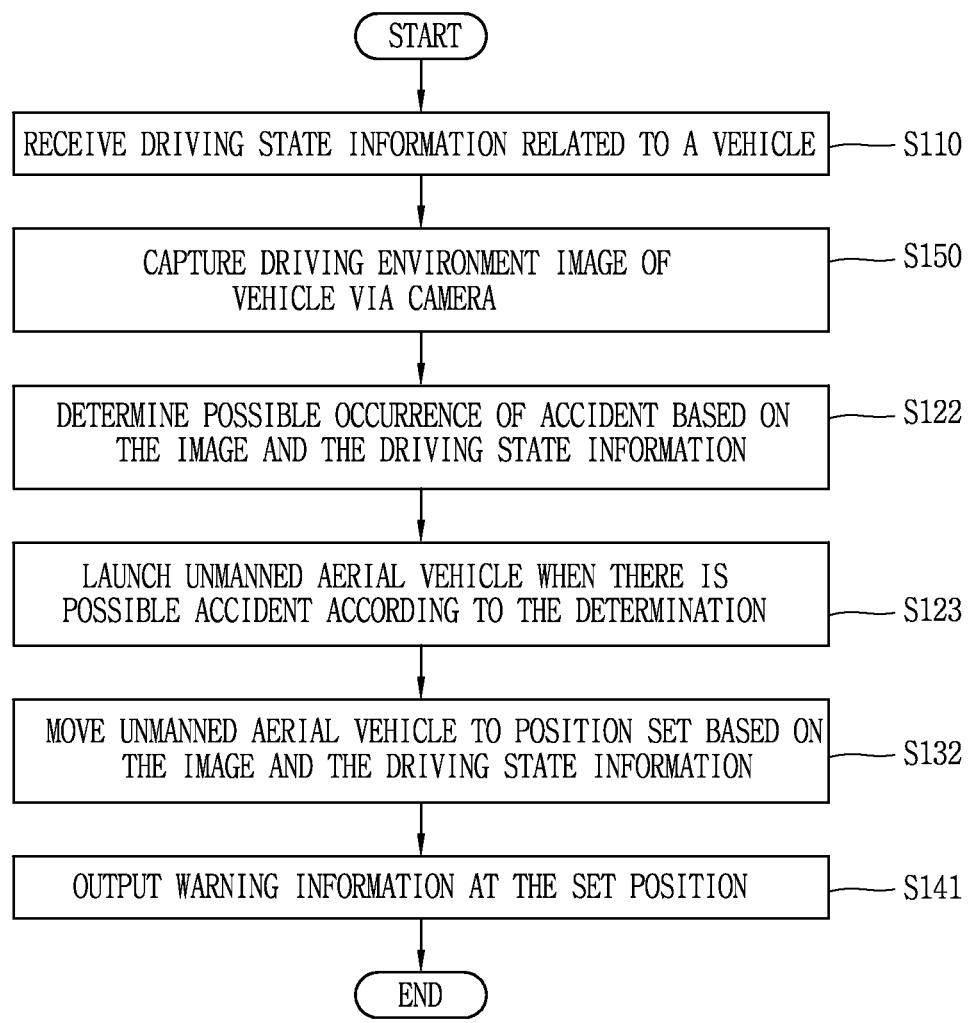
FIG. 16A is a conceptual view illustrating a control method of launching an unmanned aerial vehicle on the basis of the chance of an accident.
Figure 16B:
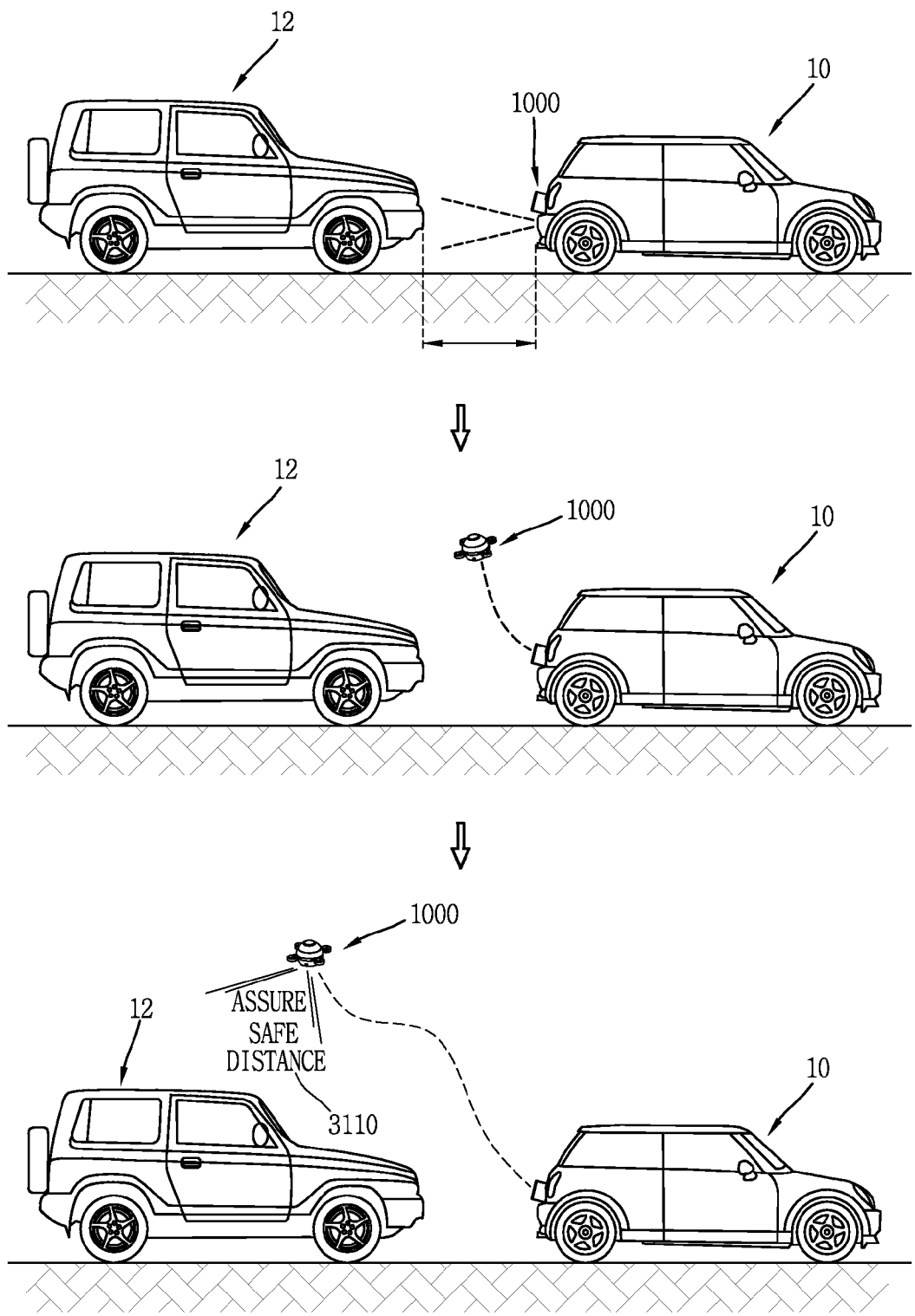
FIGS. 16B, 16C and 16D are conceptual views illustrating a method for controlling an unmanned aerial vehicle based on the chance of an accident in accordance with different exemplary embodiments.
Figure 16C:
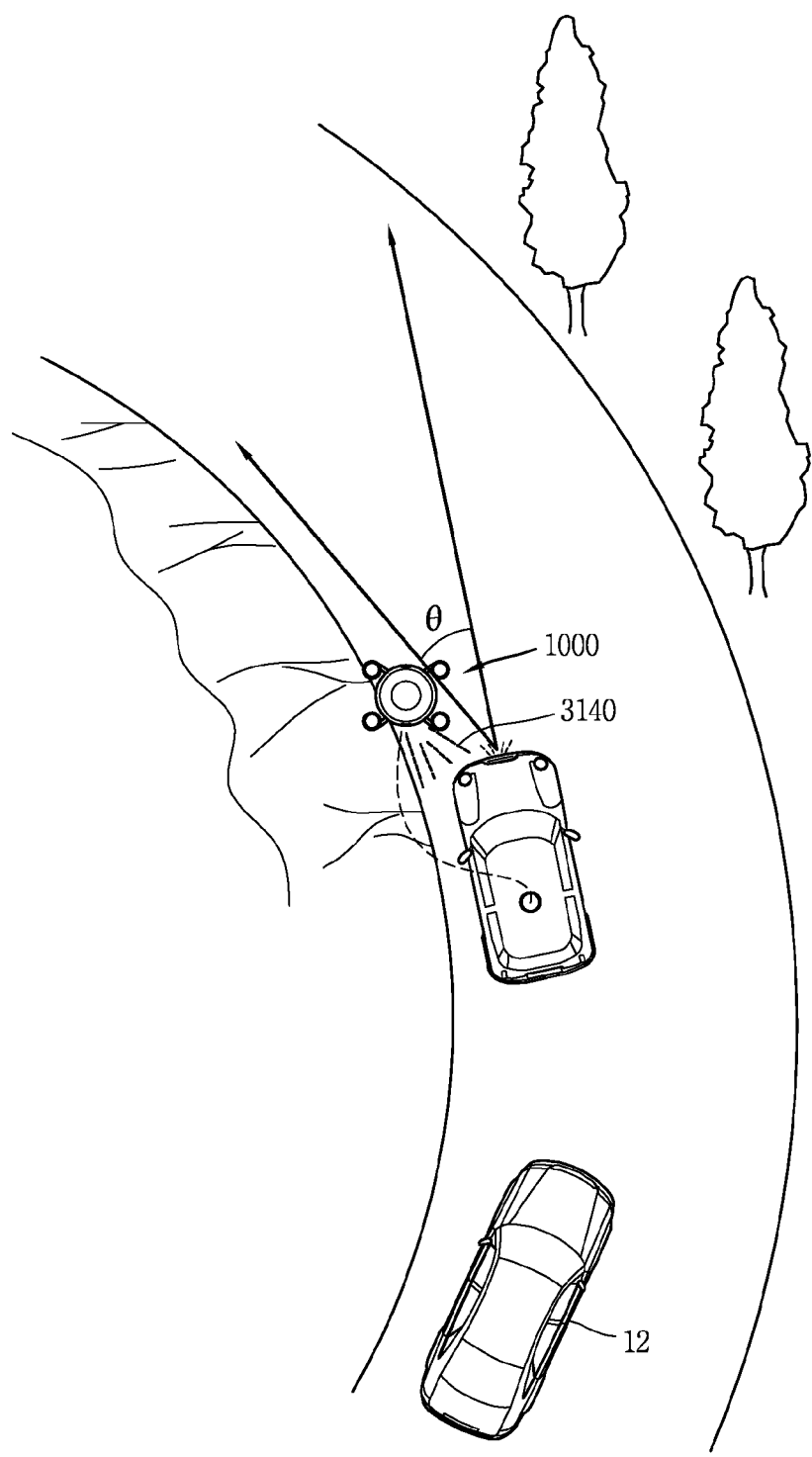
Figure 16D:
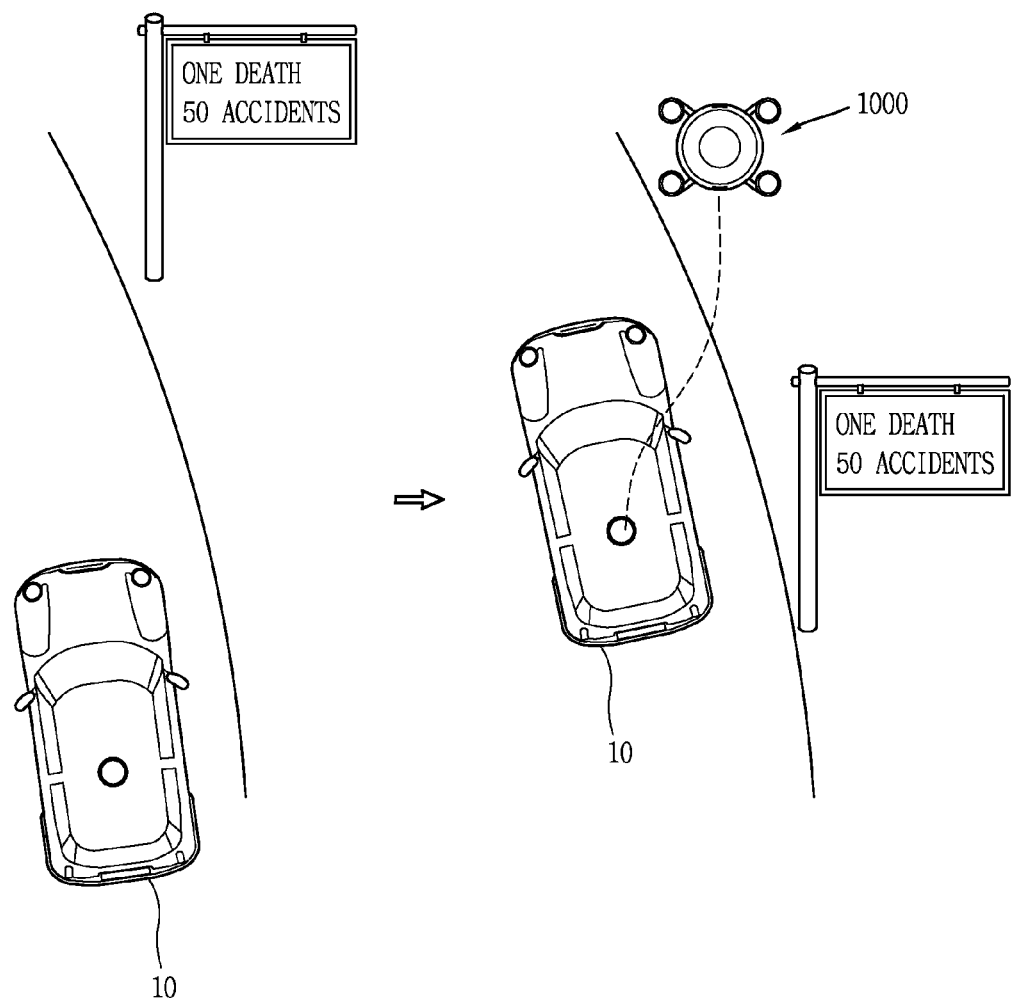

FIG. 16A is a conceptual view illustrating a control method of launching an unmanned aerial vehicle on the basis of the chance of an accident, and FIGS. 16B to 16D are conceptual views illustrating a method for controlling an unmanned aerial vehicle based on the chance of an accident in accordance with different exemplary embodiments.

Hereinafter, a control method for an unmanned aerial vehicle based on determination of a possible accident due to an ambient environment will be described with reference to FIGS. 16A and 16B. The wireless communication unit receives driving state information related to the vehicle (S110).

A driving environment of the vehicle is imaged via a camera (S150). Here, the camera may correspond to the fourth camera 1121*d* (see FIG. 8A) which is disposed on the unmanned aerial vehicle 1000. Or, the controller may receive an image captured by a camera disposed on the vehicle 10 along with the driving state information.

The controller determines whether or not an accident may occur based on the image of the driving environment and the driving state information (S122). That is, the controller determines the chance of a collision (or contact) with the captured driving environment, on the basis of a driving speed, a driving direction and the like included in the driving state information related to the vehicle 10.

Referring to FIG. 16B, an image of a rear vehicle 12 following behind the vehicle 10 is captured via the camera. The controller may sense a moving speed of the rear vehicle 12 based on the image and calculate a moving speed of the vehicle 10 based on the driving state information, thereby determining possibility of a contact (collision) between the rear vehicle 12 and the vehicle 10. Or, when it is determined that a distance between the rear vehicle 12 and the vehicle 10 is less than a safe distance based on the image, the controller may determine that there is the chance of the accident.

If it is determined that there is the chance of the accident, the controller launches the unmanned aerial vehicle 1000 (S123), and the unmanned aerial vehicle 1000 then flies toward a position set based on the image and the driving state information (S132). The unmanned aerial vehicle 1000 outputs warning information 3110 (e.g., Assure safe distance) when reaching the set position (S141).

For example, the set position may correspond to an area adjacent to the rear vehicle 12. Accordingly, the user can avoid an accident which is likely to happen irrespective of the user's driving.

Here, when the user is in a situation that an accident can be avoided by the user's driving control, the unmanned aerial vehicle 1000 may be controlled to output warning information to the user.

Referring to FIG. 16C, when a risk factor for an accident is included in expected driving information obtained from the ambient environment that is generated based on the camera-captured image and/or the driving state information, and driving information on the vehicle, the unmanned aerial vehicle 1000 is launched.

For example, when the vehicle moves around a curve, information related to a shape of a road may be collected based on the image and the driving state information. The road shape information may include information related to a curvature of the road. The controller may determine that there is the chance of an accident when an angle θ formed between the curvature of the road and the driving direction of the vehicle 10 is more than a preset reference angle. That is, the unmanned aerial vehicle 1000 is launched in order to prevent an accident that the vehicle 10 is driven off the curved road.

The unmanned aerial vehicle 1000 flies to the set position based on the chance of the accident, and outputs warning information 3140. In this instance, the set position corresponds to a position at which the driver of the vehicle 10 can recognize the warning information 3140. That is, the position may be set to the front of the vehicle 10.

The controller also controls the unmanned aerial vehicle 1000 to fly under the same condition as a driving condition of the vehicle 10 on the basis of the driving state information. That is, the driver who is driving the vehicle 10 can be provided with the warning information from the unmanned aerial vehicle 1000 which follows behind the driver's vehicle 10.

Although not illustrated, when it is determined that there is the chance of the accident of the vehicle 10, the controller may launch the unmanned aerial vehicle 1000 toward the rear vehicle 12. In this instance, the unmanned aerial vehicle 1000 may provide warning information indicating that the rear vehicle 12 should assure a safe distance from the vehicle 10 moving ahead.

Also, when an object is found on a road on which the vehicle 10 is expected to move on the basis of the driving state information and the image, the controller may predict the chance of the accident.

Referring to FIG. 16D, the unmanned aerial vehicle 1000 launched based on the driving state information may capture the external environment. The wireless communication unit may receive information related to a road on which the vehicle 10 is moving. When it is determined that there is the chance of an accident based on the road-related information, the controller may launch the unmanned aerial vehicle 1000. For example, the driving state information may correspond to statistic data for accidents that happened on the road.

The controller may control the first and second cameras 1121a and 1121b of the launched unmanned aerial vehicle 1000 to capture the external environment. When it is determined that there is the chance of the accident based on the captured images by the first and second cameras 1121a and 1121b and the driving state information, the controller may control the unmanned aerial vehicle 1000 to output warning information.

According to this embodiment, even information related to an area that cannot be captured by a device mounted in the vehicle can be collected via the cameras provided at the unmanned aerial vehicle 1000, thereby effectively preventing an accident.

Figure 17A:
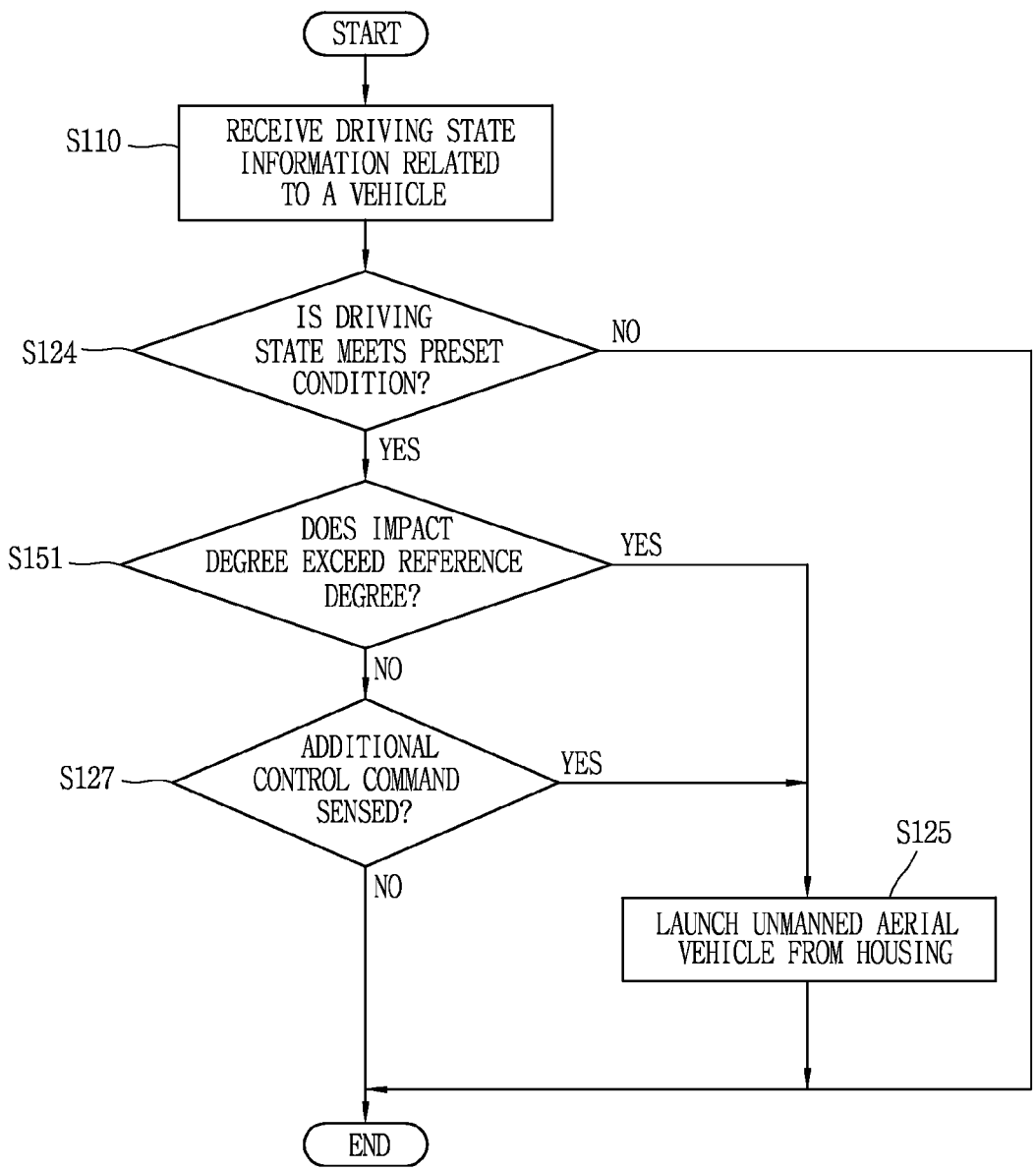
FIG. 17A is a flowchart illustrating a control method for launching an unmanned aerial vehicle based on a degree (or a level) of an impact.
Figure 17B:
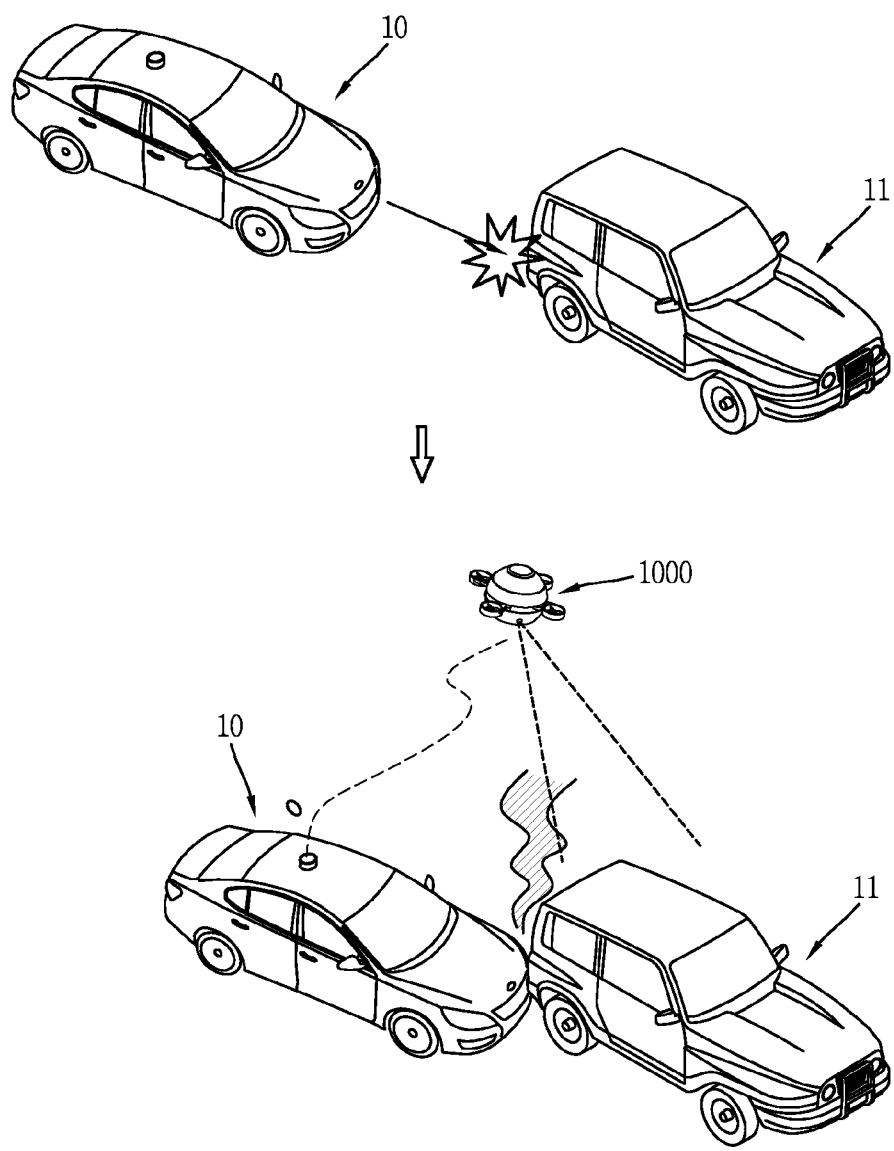
FIGS. 17B and 17C are conceptual views illustrating a control method for launching an unmanned aerial vehicle based on a degree (or a level) of an impact.
Figure 17C:
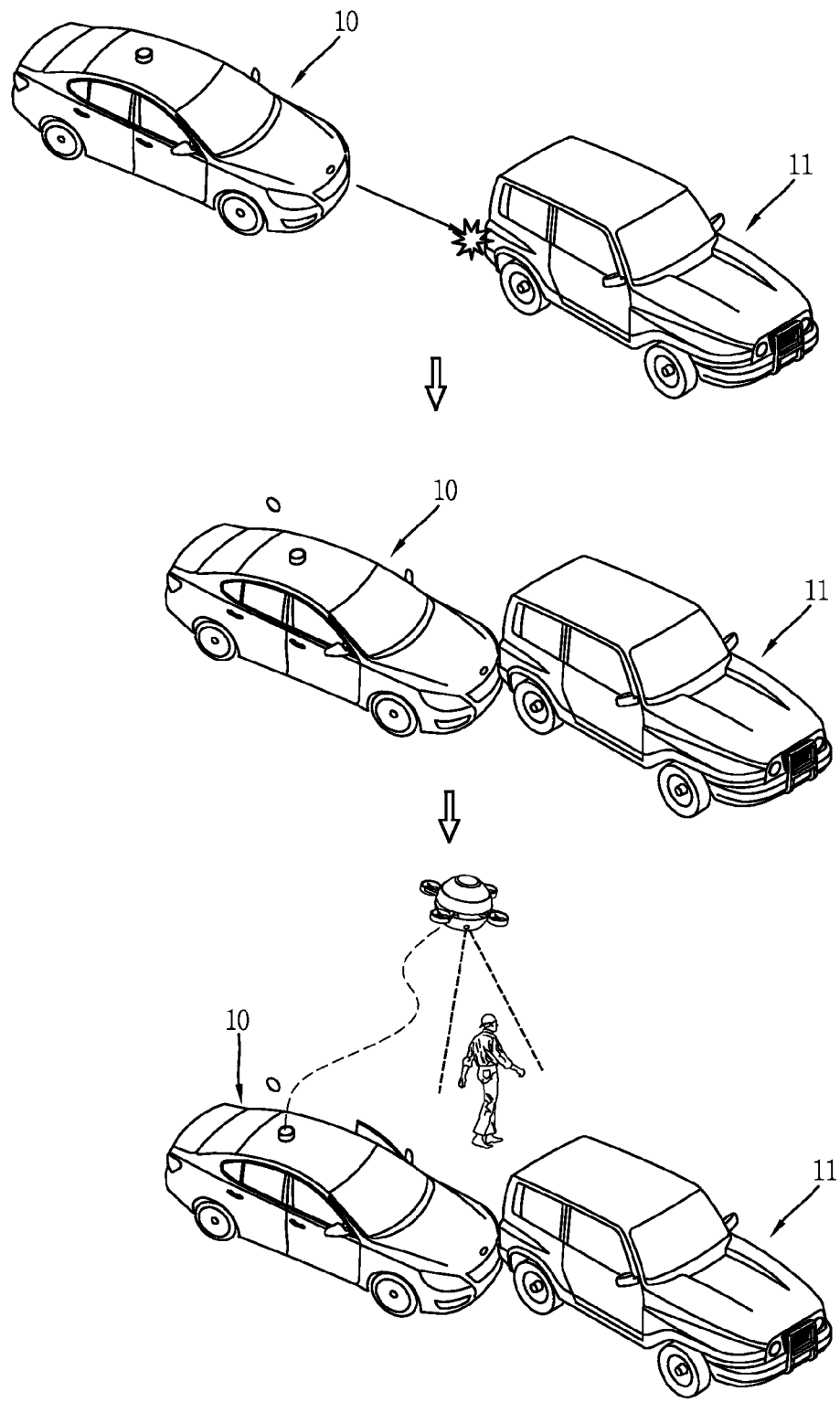

FIG. 17A is a flowchart illustrating a control method for launching an unmanned aerial vehicle based on a degree (or a level) of an impact, and FIGS. 17B and 17C are conceptual views illustrating the control method for launching the unmanned aerial vehicle based on the degree of an impact.

As illustrated in FIGS. 17A to 17C, the wireless communication unit receives driving state information related to a vehicle (S110). It is then determined whether the driving state meets a preset condition (S124). For example, the preset condition is a condition for determining that an impact judged as an accident of the vehicle 10 has been generated, and may be decided based on a shape of the impact, a range of the impact, a driving state when the impact is generated, and the like.

If the driving state meets the preset condition, it is determined whether a degree of the impact exceeds a reference degree is determined based on the driving state (S151). The reference degree may be set by a user or preset based on a type of the vehicle and a state of the vehicle.

When the degree of the impact is more than the reference degree, the unmanned aerial vehicle 1000 is launched from the housing 2000 (S125). FIG. 17B illustrates a case where an impact more than a preset reference degree has been generated due to a collision between the vehicle 10 and another vehicle 11. In this instance, the unmanned aerial vehicle 1000 is launched from the vehicle 10 without a separate control command.

Meanwhile, referring to FIG. 17C, the unmanned aerial vehicle 1000 is not launched when an impact weaker than the preset reference degree is generated due to a minor collision.

When the degree of the impact is weaker than the reference degree, it is then determined whether an additional control command is sensed (S152). When the additional control command is sensed, the unmanned aerial vehicle 1000 is launched from the housing 2000.

For example, the additional control command may be generated when a driver gets out of the vehicle, or correspond to a control command applied to an external device which performs wireless communication with the unmanned aerial vehicle.

The unmanned aerial vehicle may perform wireless communication with a preset mobile terminal. The mobile terminal may be a watch type terminal, a glass type terminal and the like that is wearable on a driver's body and may be implemented as any type without limit.

The unmanned aerial vehicle 1000 which has been launched in response to the additional control command is controlled to fly based on the driver's movement. The unmanned aerial vehicle 1000 may be controlled to fly adjacent to the driver and capture the ambient environment through the first and second cameras 1121a and 1121b. A moving path of the unmanned aerial vehicle 1000 may be generated according to the driver's movement captured by the third camera 1121c, or through communication with an external terminal (mobile terminal) belonging to the driver.

According to this embodiment, when an accident happens, the unmanned aerial vehicle 1000 can capture the scene of the accident without a separate control command while the driver inspects the happened accident. In case of a minor accident, the launch of the unmanned aerial vehicle 1000 may be restricted so as to reduce power consumption.

The first and second cameras 1121a and 1121b of the unmanned aerial vehicle 1000 may perform 360-degree capturing based on the scene of the accident or capture a collision-occurred area.

Although not illustrated in detail, the unmanned aerial vehicle may transmit the captured images to the external device or a preset server. Here, the server may correspond to a control center which handles accidents happening on roads.

Figure 18A:
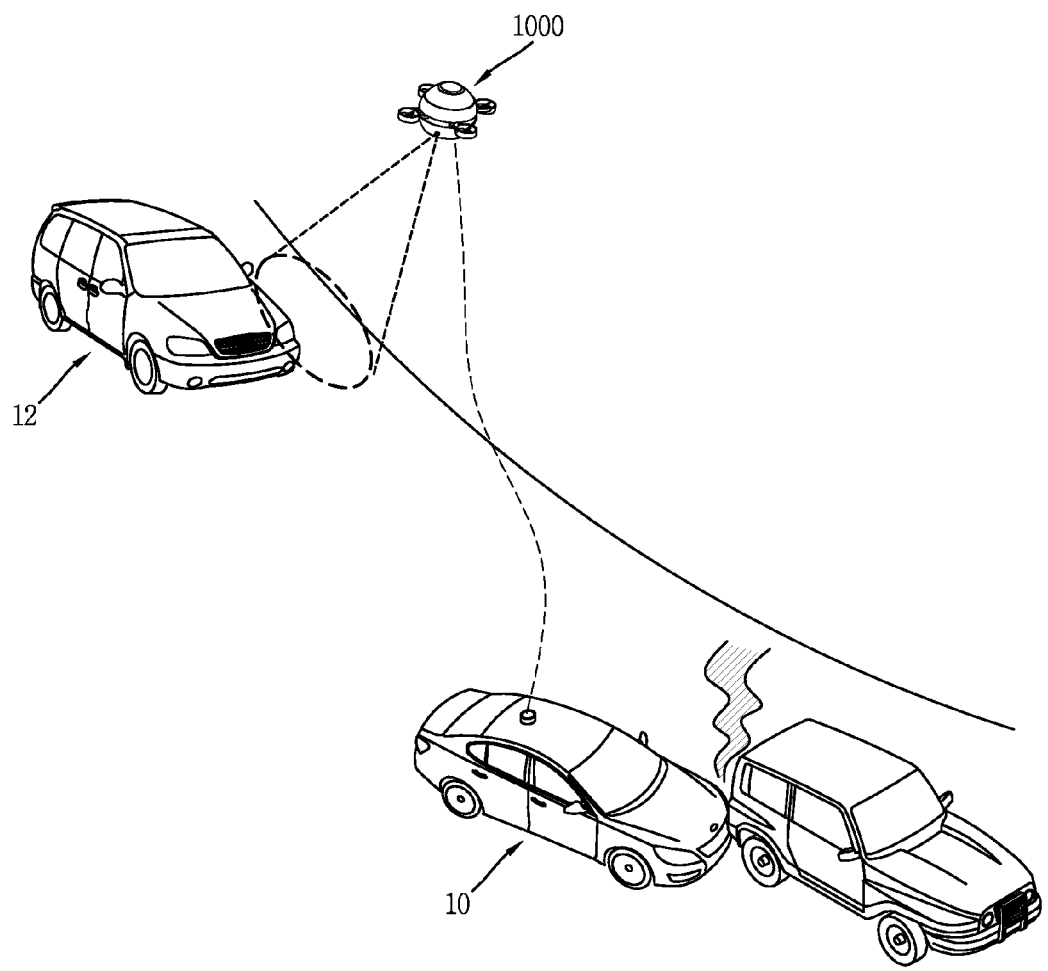
FIGS. 18A and 18B are conceptual views illustrating a control method of outputting visual information from an unmanned aerial vehicle when an accident happens.
Figure 18B:
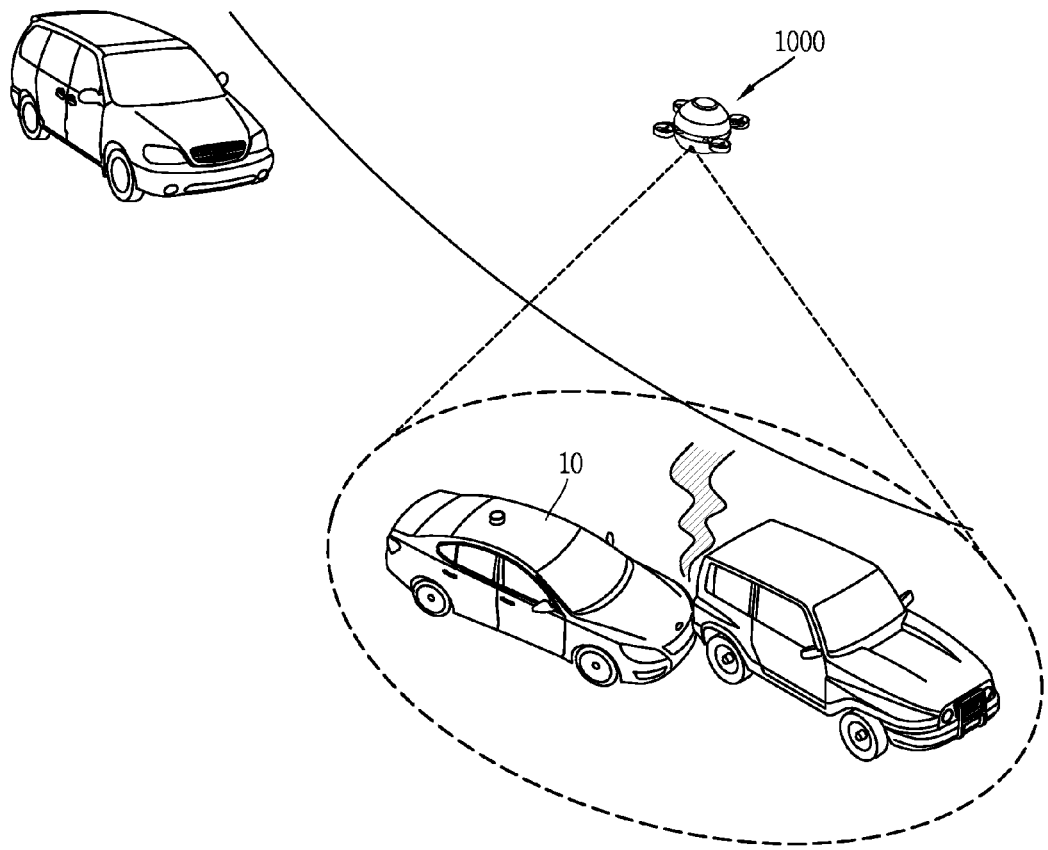

FIGS. 18A and 18B are conceptual views illustrating a control method of outputting visual information from an unmanned aerial vehicle when an accident happens.

As illustrated in FIG. 18A, when an accident happens, the unmanned aerial vehicle 1000 is launched from the vehicle 10. A position to which the unmanned aerial vehicle 1000 is to fly is set based on driving state information related to the vehicle 10. When the accident is determined to have happened at a distance which cannot be recognized by a rear vehicle 12 following behind the vehicle 10, the position may be set to an area adjacent to the rear vehicle 12.

When another vehicle is not sensed within a preset range by the first and second cameras 1121a and 1121b of the unmanned aerial vehicle 1000, the controller controls the unmanned aerial vehicle 1000 to fly opposite to the moving direction of the vehicle 10 based on the driving state information.

The unmanned aerial vehicle 1000 controls the display unit 1151 to emit light of a preset pattern to an area adjacent to the rear vehicle 12. For example, the display unit 1151 may output light in a manner of flicking at a specific time interval. Or, the display unit 1151 may output a preset image.

Accordingly, the rear vehicle 12 may sense the occurrence of the accident ahead of it even though it does not recognize the area where the accident has happened.

Meanwhile, referring to FIG. 18B, when the area of the accident is an area adjacent to the rear vehicle and thus the rear vehicle can recognize the accident area, the controller may set the area adjacent to the accident area to a position to which the unmanned aerial vehicle 1000 is to fly.

That is, when another vehicle is sensed by the first and second cameras 1121a and 1121b, one area including the vehicle 10 is set to the position to which the unmanned aerial vehicle 1000 is to fly.

The controller may control the display unit 1151 to emit light to the accident area. The light may be output to be flickered in a preset pattern, but is not limited to this. As the accident area becomes bright due to the light, other drivers can more easily recognize the accident area.

That is, the unmanned aerial vehicle 1000 may set the position to which the unmanned vehicle is to fly using the captured images of the ambient environment of the area where the accident has happened, and notify the accident to a driver whose vehicle is likely to collide with the vehicle 10, thereby preventing a secondary accident.

Figure 19A:
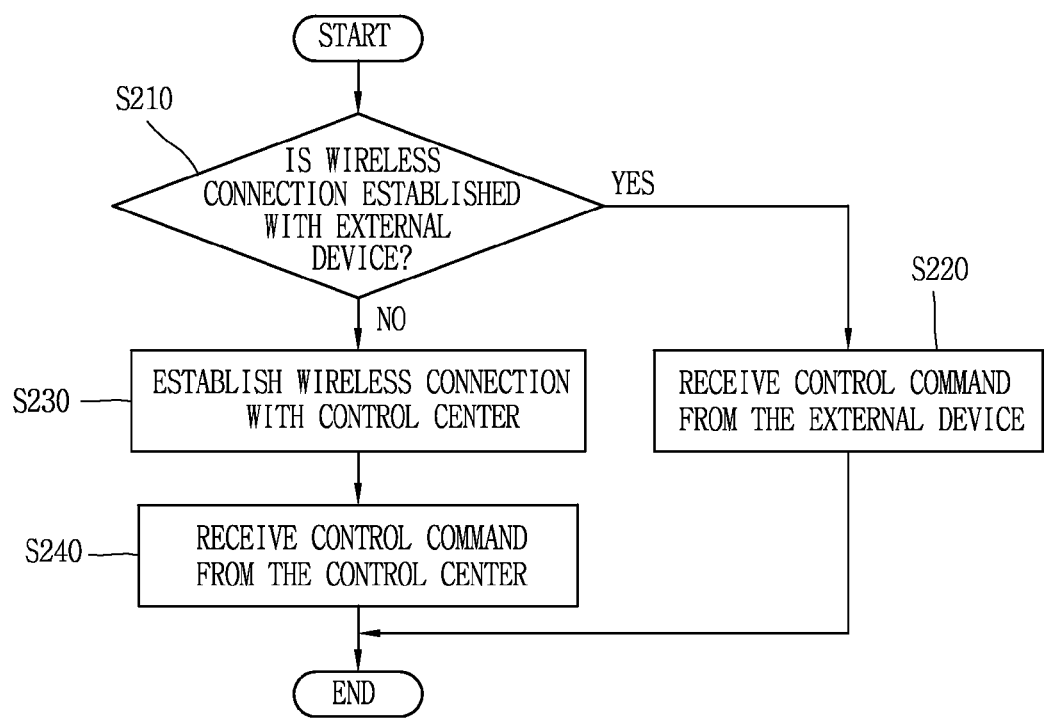
FIG. 19A is a flowchart illustrating an unmanned aerial vehicle controlled by an external device.
Figure 19B:
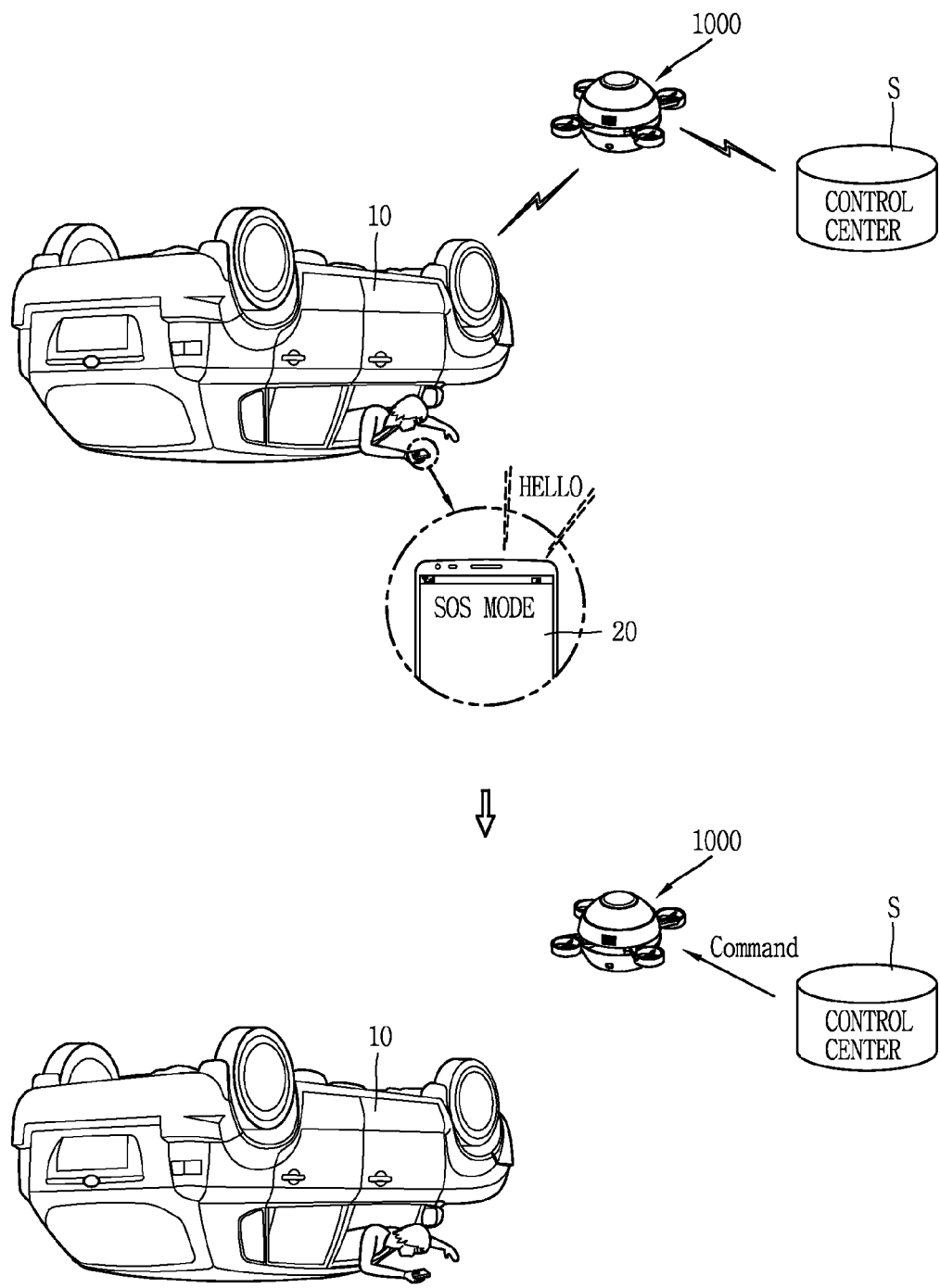
FIGS. 19B, 19C and 19D are conceptual views illustrating a method for controlling an unmanned aerial vehicle under different situations.
Figure 19C:
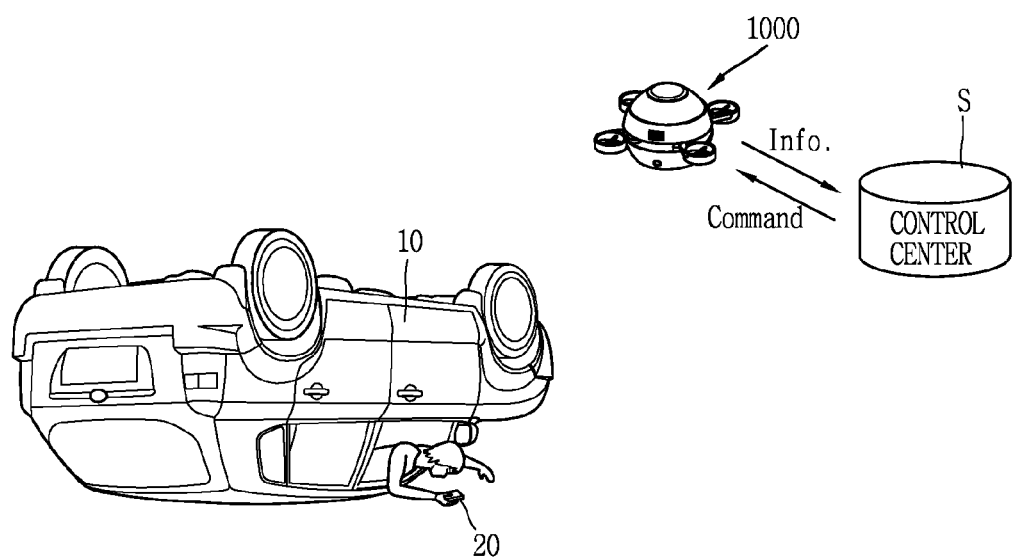
Figure 19D:
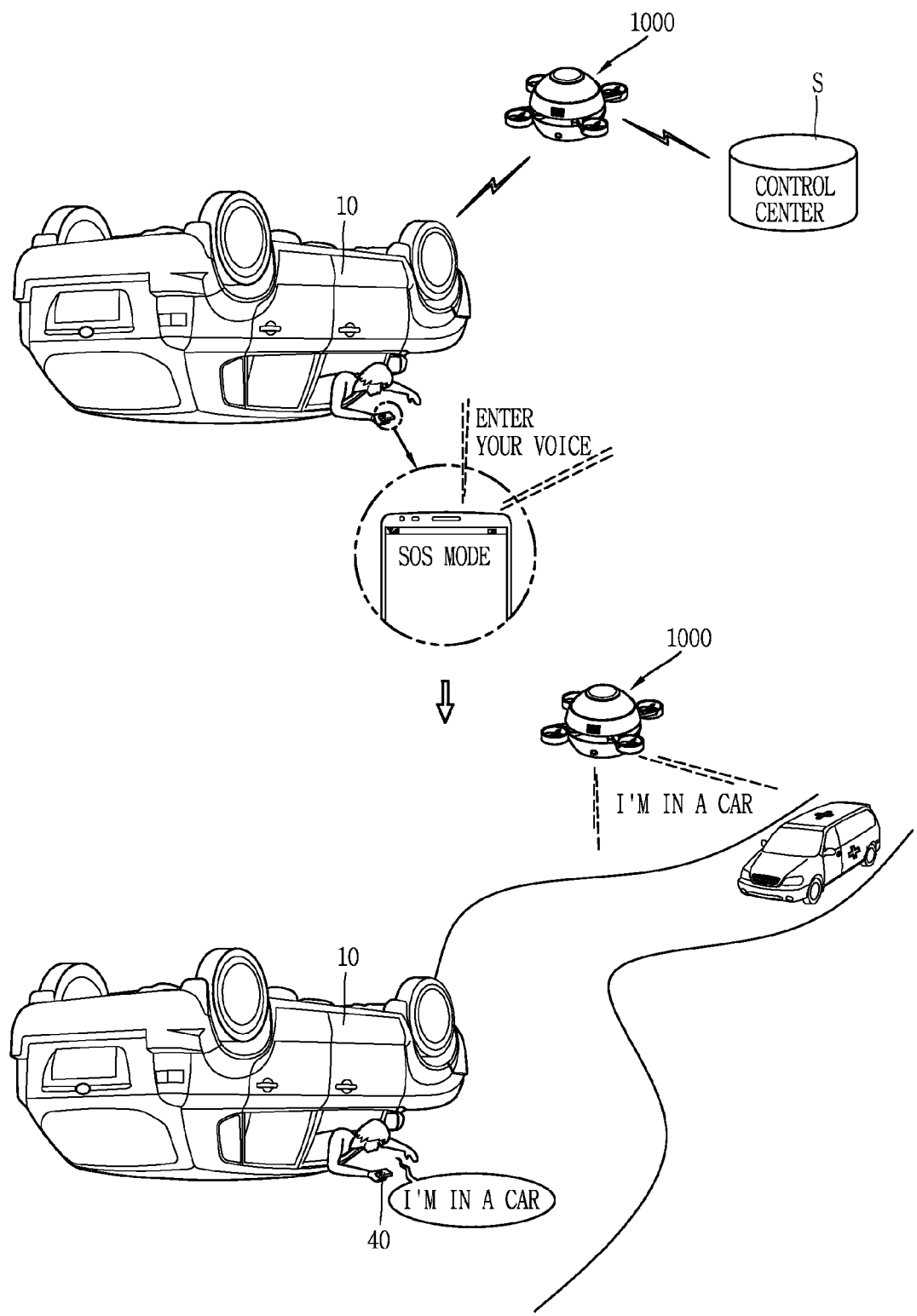

FIG. 19A is a flowchart illustrating a method of controlling an unmanned aerial vehicle via an external device, and FIGS. 19B to 19D are conceptual views illustrating the method for controlling the unmanned aerial vehicle under different situations. These embodiments illustrate a control method after the unmanned aerial vehicle 1000 is detached from the vehicle 10.

As illustrated in FIG. 19A, the wireless communication unit attempts to establish a wireless connection with an external device (S210). Here, the external device desired to be connected in the wireless manner may be preset. The controller may control the wireless communication unit to attempt the connection with an external device which is located within a preset range from the unmanned aerial vehicle 1000. In this instance, the wireless communication unit may perform the wireless connection with the external device through a specific authentication procedure. For example, the unmanned aerial vehicle may control the wireless communication unit to transmit an authentication request signal to the external device and to perform the wireless connection when an authentication code is received from the external device.

When the wireless communication connection with the external device is successfully established, the controller controls the wireless communication unit to receive a control command from the external device.

Here, the wireless communication unit of the unmanned aerial vehicle may serve as a relay with a driver's wearable device (and mobile terminal) and a server including a control center S. That is, a terminal belonging to the driver and an external server (or another driver's mobile terminal) can transmit and receive wireless signals each other via the wireless communication unit.

As illustrated in FIGS. 19A and 19B, upon the failure of the wireless connection with the external device, the wireless communication unit performs wireless communication with the control center (S230). The wireless communication unit receives a control command from the control center (S240). The wireless communication unit may perform the wireless communication with the external device and the control center S using Bluetooth™ (BT) or Wi-Fi, but may not be limited to this.

For example, when a wireless signal for the wireless connection sent from the unmanned aerial vehicle is received in an external device 20, a notification of the reception may be output. In this instance, when a control signal accepting the wireless connection is applied by a user, the wireless connection is carried out. When the control signal accepting the wireless connection is not applied from the user within a preset time (or when the number of transmissions of the wireless signal exceeds a preset number of times), the wireless connection fails.

Meanwhile, when a control signal denying the wireless connection is received from the external device 20 which has received the wireless signal, the controller may attempt to perform the wireless connection with another external device.

The wireless communication unit may transmit information related to the vehicle 10 and accident-related information to the control center S on the basis of the driving state information when attempting to perform the wireless communication with the control center S. The control center S transmits a control command according to a preset step. The preset step may be selected on the basis of the vehicle-related information and the accident-related information received in the control center S.

For example, a destination to which the unmanned aerial vehicle 1000 is to fly may be set or electronic components included in the unmanned aerial vehicle 1000 may be controlled based on the control command. The unmanned aerial vehicle 1000 may output warning information at a position set based on the control command.

Referring to FIG. 19B, the controller transmits information collected by the unmanned aerial vehicle 1000 to the control center S, and controls the wireless communication unit to receive a control command based on the information.

Here, the collected information may correspond to an image which is captured in real time by one of the first and second cameras 1121a and 1121b of the unmanned aerial vehicle 1000. Although not illustrated in detail, the control center S may transmit an individual control command to the unmanned aerial vehicle 1000 on the basis of the real-time collected information.

In this instance, the controller may control the wireless communication unit to receive one control command corresponding to one information. According to this embodiment, the unmanned aerial vehicle 1000 may provide real-time information to the control center and receive an appropriate control command therefor.

For example, when a driver is judged to be injured, the control center S may connect a communication device belonging to a doctor, who is located at a long distance, to the unmanned aerial vehicle 1000 in a wireless manner. Accordingly, the doctor may receive a captured image of the driver and transmit an instruction for first-aid treatment. The instruction (for example, the doctor's voice) may be output through the display unit 1151 and/or the first and second audio output modules 1152a and 1152b of the unmanned aerial vehicle 1000.

Referring to FIG. 19B, when the wireless connection with the external device 20 is established, the wireless communication unit receives a control command from the external device 20. After establishing the wireless connection with the external device 20, the wireless communication unit may perform a wireless connection with the control center S based on the control command.

When the wireless connection with the unmanned aerial vehicle is established, the external device 20 outputs a notification of the established wireless connection and receives a control command. The driver may input the control command via a voice. The voice may be used to control the unmanned aerial vehicle 1000 according to a natural language processing algorithm.

The controller may control the first and second audio output modules 1152a and 1152b to output a voice input to the external device 20. For example, the unmanned aerial vehicle 1000 may output the driver's voice after flying toward another vehicle or person, to notify an occurrence of an accident and the driver's existence.

Accordingly, the unmanned aerial vehicle may receive a control command from a driver who has an external device but is unable to move, and request rescue of the driver.

Figure 20A:
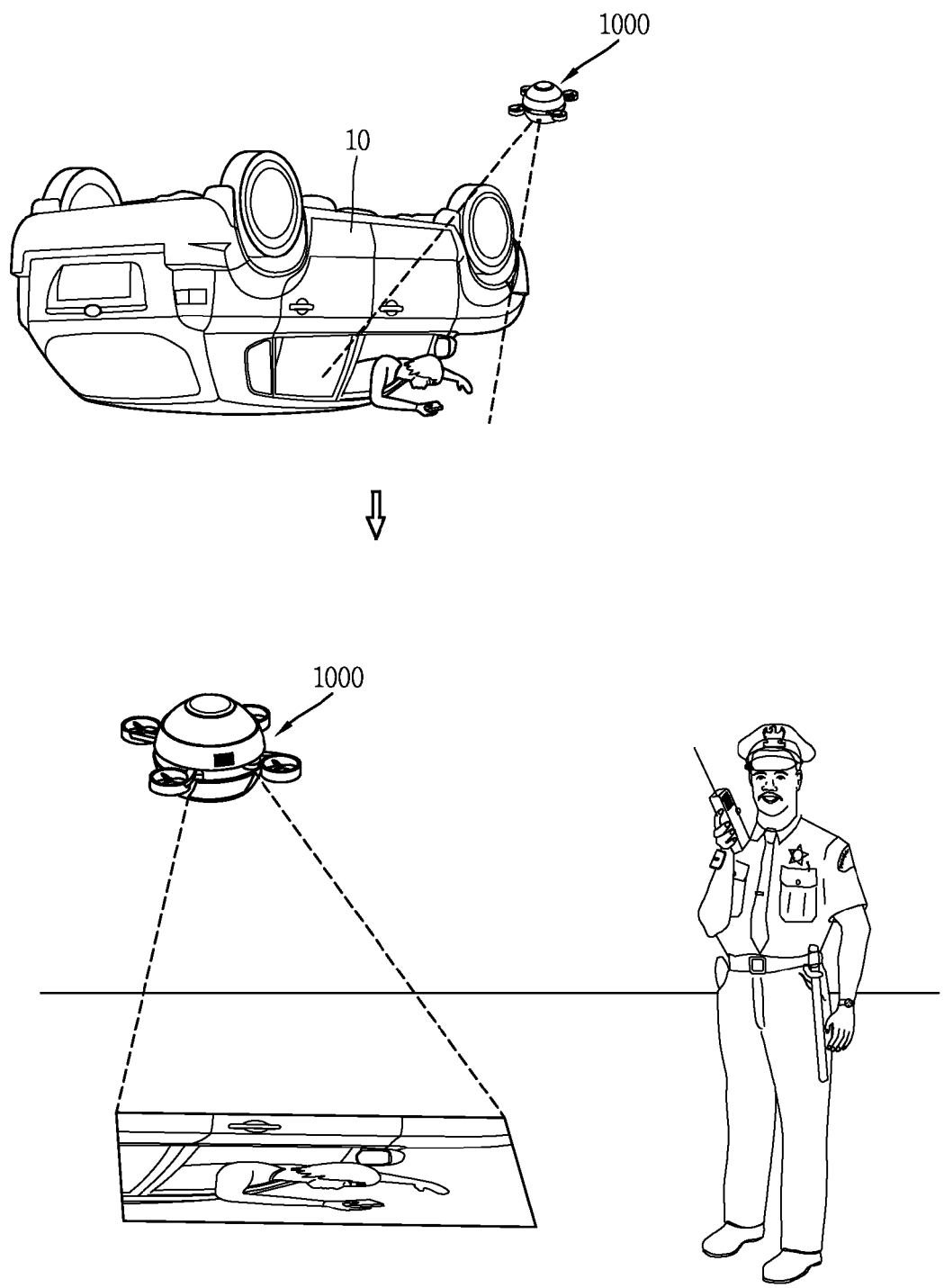
FIGS. 20A and 20B are conceptual views illustrating a method for controlling an unmanned aerial vehicle to notify an existence of a driver in accordance with different exemplary embodiments disclosed herein.
Figure 20B:
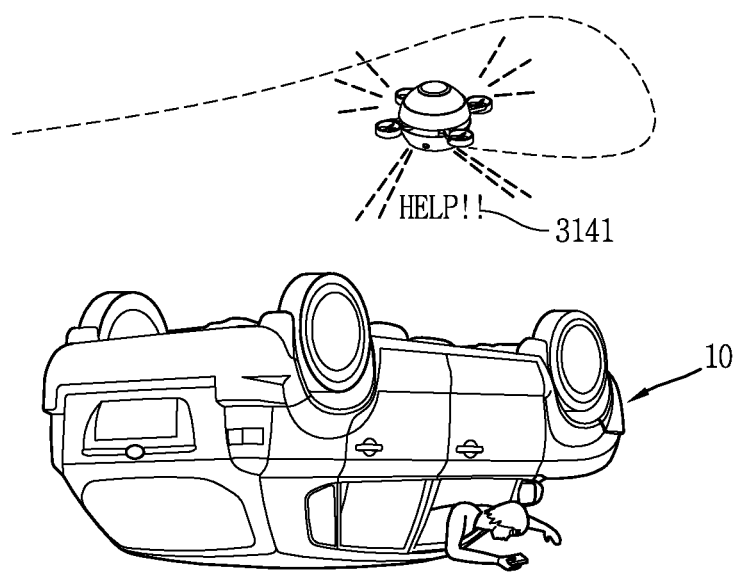

FIGS. 20A and 20B are conceptual views illustrating a method for controlling an unmanned aerial vehicle to notify existence of a driver in accordance with different exemplary embodiments of the present invention. The unmanned aerial vehicle 1000 according to these embodiments searches for a driver while flying above an accident area after being launched. The controller controls the first and second cameras 1121a and 1121b to capture the accident area. When the driver (and people at the scene of the accident) is searched for by the first and second cameras 1121a and 1121b, the controller controls the unmanned aerial vehicle 1000 accordingly.

For example, the unmanned aerial vehicle may store information related to the driver. The controller may determine whether or not information related to a person who has been captured by the first and second cameras 1121a and 1121b matches the driver-related information.

Referring to FIG. 20A, when the driver is found by using the first and second cameras 1121a and 1121b, the controller may control one of the first to third cameras 1121a, 1121b and 1121c to capture the scene of the accident including the driver.

The controller can control the unmanned aerial vehicle 1000 to move away from the scene of the accident by a preset distance or toward a preset position and controls the display unit 1151 to output the captured image of the scene of the accident. The display unit 1151 may directly output the mage or output the image on a wide area (for example, on the ground) by emitting light.

According to this embodiment, when the driver is located at the scene of the accident in an area difficult to find, the driver's location can be recognized more correctly via the captured image, thereby facilitating the rescue of the driver.

Referring to FIG. 20B, when the driver is determined to be located at the scene of the accident via the image, the controller controls the unmanned aerial vehicle 1000 to output a notification sound 3141 through the first and second audio output modules 1152a and 1152b while flying above the area where the driver has been found.

According to this embodiment, the driver's location can be detected based on the notification sound, thereby facilitating the rescue of the driver.

Figure 21:
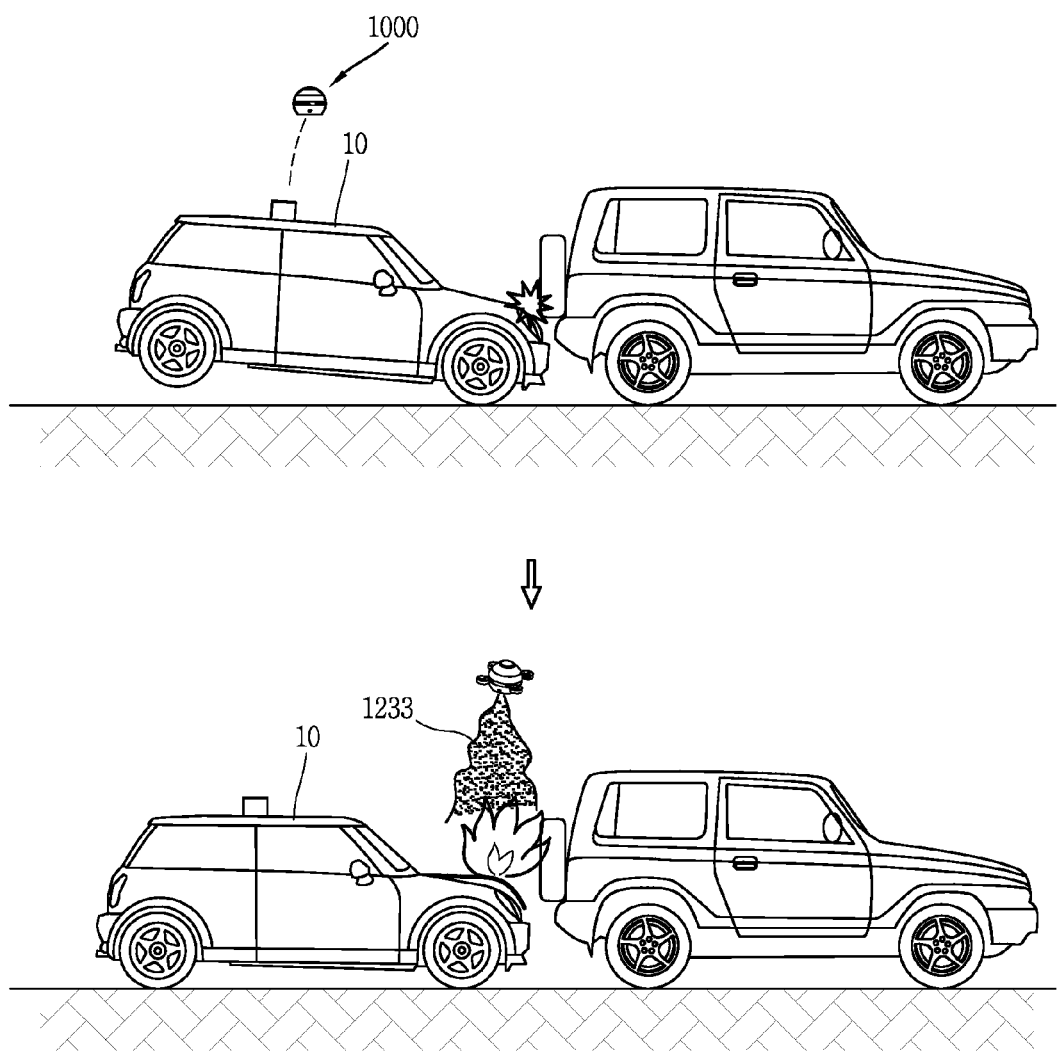
FIG. 21 is a conceptual view illustrating a method for controlling an unmanned aerial vehicle when an outbreak of a fire is detected.

FIG. 21 is a conceptual view illustrating a method for controlling an unmanned aerial vehicle when an outbreak of a fire is detected.

Referring to FIGS. 9A and 21, when the driving state of the vehicle 10 meets a preset condition, for example, when an impact is detected from the vehicle 10, the unmanned aerial vehicle 1000 is launched from the vehicle 10. An outbreak of a fire may be sensed by the first and second cameras 1121a and 1121b.

When the outbreak of the fire in the vehicle 10 is determined by the unmanned aerial vehicle 1000, the controller controls the hinge cover 1232 to open such that the extinguishing material 1233 can be discharged to the fire area.

Accordingly, a massive fire can be put out fast by the extinguishing material 1233 stored in the unmanned aerial vehicle 1000.

Figure 22:
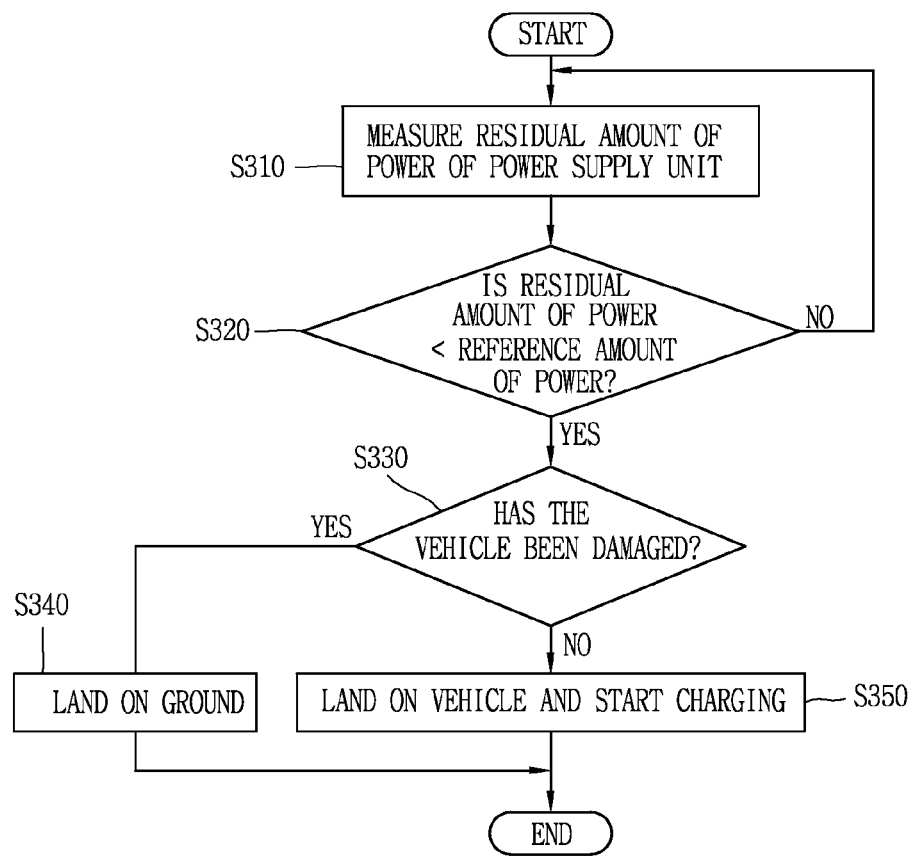
FIG. 22 is a conceptual view illustrating a method for controlling an unmanned aerial vehicle according to a residual amount of power of a power supply unit.

FIG. 22 is a flowchart illustrating a method for controlling an unmanned aerial vehicle according to a residual amount of power of a power supply unit. During the flight of the unmanned aerial vehicle 1000, the unmanned aerial vehicle may receive information related to a measured residual amount of power of the power supply unit 1191 (S310). The unmanned aerial vehicle 1000 may measure the residual amount of power of the power supply unit 1191 at a preset period, and transmit measurement information.

The controller determines whether or not the residual amount of power is smaller than a reference amount of power (S320). When the residual amount of power is greater than or equal to the reference amount of power, the unmanned aerial vehicle 1000 is kept flying.

When the residual amount of power is smaller than the reference amount of power, the controller determines whether the vehicle 10 has been damaged (S330). For example, the controller may sense the state of the vehicle 10 via one of the first to third cameras 1121a, 1121b and 1121c of the unmanned aerial vehicle 1000. Specifically, the controller may check information related to damage of the housing 2000 mounted on the vehicle 10. When it is determined that the unmanned aerial vehicle 1000 is unable to be wirelessly charged while being accommodated in the housing 2000, it is determined that the vehicle 10 is damaged.

Here, the residual amount of power may correspond to minimum power which is required for the unmanned aerial vehicle 1000 to perform communication and to be stably landed on the ground or the vehicle. For example, the residual amount of power allowed may be set to about 5% of fully-charged power.

When the vehicle 10 has not been damaged, the controller controls the unmanned aerial vehicle 1000 to perform the wireless charging by being mounted on the vehicle 10 (S350).

Here, when the housing 2000 has been so damaged that the unmanned aerial vehicle 1000 cannot be accommodated therein or the danger of an explosion of the vehicle 10 is sensed, the controller controls the unmanned aerial vehicle 1000 to land on the ground (S340).

According to this embodiment, the unmanned aerial vehicle 1000 can be prevented from being damaged due to the power shortage during the flight.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An unmanned aerial vehicle apparatus comprising:
a housing having a frame and a cover unit that form an inner space with the cover unit covering the inner space, the housing mounted on a driving vehicle;
a launching unit inside the inner space;

an unmanned aerial vehicle loaded in the inner space and configured to be launched from the housing, the unmanned aerial vehicle comprising wing units configured to guide flight of the unmanned aerial vehicle and an output unit configured to output information;

a control supporting member configured to protrude from the frame or be inserted into the frame and located in a gap between the frame and the unmanned aerial vehicle; and a controller configured to:

control the launching unit to launch the unmanned aerial vehicle from the housing based on a driving state of the driving vehicle and a preset condition; and control the wing units to maneuver the unmanned aerial vehicle after launch to a position that is set based on first information related to the driving state; and control the output unit to output second information related to the driving state when the unmanned aerial vehicle is at the position, wherein the cover unit is detachably connected to the frame, wherein the launching unit includes an airbag, wherein launching the unmanned aerial vehicle comprises inflating the airbag based on the driving state and the preset condition, wherein the control supporting member is configured to restrict launch of the unmanned aerial vehicle in a preset state even though the airbag is inflated or to control a launching speed of the unmanned aerial vehicle when an outer surface of the unmanned aerial vehicle is firmly supported by the control supporting member, wherein the unmanned aerial vehicle has a flat lower cover that is a center of gravity of the unmanned aerial vehicle, wherein the wing units are maintained in an inactive state until the launched unmanned aerial vehicle is landed, and wherein the wing units are activated only after the lower cover of the landed unmanned aerial vehicle contacts the ground.

2. The apparatus of claim 1, wherein:

the unmanned aerial vehicle further comprises a wireless communication unit configured to receive the first information; and the first information comprises information related to at least a moving speed of the driving vehicle, a moving direction of the driving vehicle, a set destination of the driving vehicle, a road on which the driving vehicle moves or a position of the driving vehicle.

3. The apparatus of claim 2, wherein:

the unmanned aerial vehicle further comprises at least one camera configured to capture images of an external environment; and the first information further comprises at least one captured image.

4. The apparatus of claim 3, wherein the controller is further configured to:

determine a potential collision between the driving vehicle and an object located in the external environment based on the at least one captured image and the driving state; and control the launching unit to launch the unmanned aerial vehicle when the potential collision is determined.

5. The apparatus of claim 4, wherein the controller is further configured to:

determine a distance between the driving vehicle and another vehicle based on the at least one captured image; and control the launching unit to launch the unmanned aerial vehicle when the determined distance is less than a preset distance, wherein the preset distance corresponds to an area adjacent to the another vehicle.

6. The apparatus of claim 4, wherein the controller is further configured to:

determine a curvature of a road based on the at least one captured image;

determine an angle between a moving direction of the driving vehicle that is based on the driving state and a moving direction of the driving vehicle that is based on the determined curvature; and control the launching unit to launch the unmanned aerial vehicle when the determined angle is greater than a reference angle.

7. The apparatus of claim 1, wherein the preset condition corresponds to an impact that is generated due to the driving vehicle.

8. The apparatus of claim 7, wherein the controller is further configured to:

determine a strength of the impact; and restrict launch of the unmanned aerial vehicle when the determined strength is less than a preset reference strength.

9. The apparatus of claim 8, wherein the controller is further configured to control the launching unit to launch the unmanned aerial vehicle in response to a received control command when the determined strength is less than the preset reference strength.

10. The apparatus of claim 1, wherein the output unit comprises a display unit configured to visually output information.

11. The apparatus of claim 10, wherein the controller is further configured to control the display unit to emit light to at least one area in which the driving vehicle is located.

12. The apparatus of claim 10, wherein:

the unmanned aerial vehicle further comprises at least one camera configured to capture images of an external environment; and the controller is further configured to detect another vehicle located within a preset range of the driving vehicle based on at least one captured image and to control the wing units to maneuver the unmanned aerial vehicle in a direction opposite to a direction in which the driving vehicle is moving.

13. The apparatus of claim 12, wherein the controller is further configured to control the display unit to output light toward the another vehicle.

14. The apparatus of claim 10, wherein:

the position is spaced apart from the driving vehicle by a specific distance based on the driving state; and the controller is further configured to control the wing units to maneuver the unmanned aerial vehicle in a direction opposite to a direction in which the driving vehicle is moving.

15. The apparatus of claim 14, wherein:

the output unit is further configured to spray paint; and the controller is further configured to control the output unit to output the second information by spraying the paint.

16. The apparatus of claim 14, wherein:

the output unit further comprises a placard including the second information; and the controller is further configured to control output unit to output the second information by externally exposing the placard.

17. The apparatus of claim 14, wherein the controller is further configured to:
control the wing units to land the unmanned aerial vehicle on the ground at the position; and
control the display unit to output the second information on the ground after the unmanned vehicle is landed.

18. The apparatus of claim 1, wherein:
the output unit is further configured to output audible information; and
the controller is further configured to control the output unit to output the second information audibly.

19. The apparatus of claim 3, wherein:
the unmanned aerial vehicle further comprises a fire-extinguishing unit storing an extinguishing material; and
the controller is further configured to detect a fire based on the at least one captured image and to control the extinguishing unit to discharge the extinguishing material when the fire is detected.

20. The apparatus of claim 1, wherein:
the unmanned aerial vehicle further comprises at least one camera configured to capture images of an external environment above the unmanned aerial vehicle; and
the second information comprises at least one captured image.

21. A method for controlling an unmanned aerial vehicle having a frame mounted on a driving vehicle, a cover unit detachably connected to the frame, a control supporting member movably disposed on an inner surface of the frame and located in a gap between the frame and the unmanned aerial vehicle, wing units configured to guide flight of the unmanned aerial vehicle, a flat lower cover that is a center of gravity of the unmanned aerial vehicle, and an airbag that is inflated to launch the unmanned aerial vehicle, the method comprising:
loading the unmanned aerial vehicle in an inner space of a housing mounted on the driving vehicle;
receiving information related to a driving state of the driving vehicle;
allowing the control supporting member to protrude from the frame in a preset state to restrict launch of the unmanned aerial vehicle even though the airbag is inflated or controlling a launching speed of the unmanned aerial vehicle when an outer surface of the unmanned aerial vehicle is firmly supported by the control supporting member;
launching the unmanned aerial vehicle;
maintaining the wing units in an inactive state until the launched unmanned aerial vehicle is landed;
activating the wing units only after the lower cover of the landed unmanned aerial vehicle contacts the ground;
maneuvering the unmanned aerial vehicle to a position after launch that is set based on the driving state; and
outputting information related to the driving state when the unmanned aerial vehicle is at the position.

22. The method of claim 21, further comprising:
determining an external environment via a camera mounted in the driving vehicle; and
setting an altitude of the unmanned aerial vehicle based on the determined external environment.

23. The method of claim 21, further comprising:
determining a strength of an impact generated due to the driving vehicle; and
restricting launch of the unmanned aerial vehicle when the determined strength is less than a preset reference strength.

* * * * *